US006645078B1

(12) United States Patent
Mattice

(10) Patent No.: US 6,645,078 B1
(45) Date of Patent: Nov. 11, 2003

(54) CASINO GAMBLING APPARATUS WITH PERSON DETECTION

(75) Inventor: Harold Mattice, Gardnerville, NV (US)

(73) Assignee: International Game Technology, Reno, NV (US)

( * ) Notice: Subject to any disclaimer, the term of this patent is extended or adjusted under 35 U.S.C. 154(b) by 77 days.

(21) Appl. No.: 09/785,729

(22) Filed: Feb. 16, 2001

(51) Int. Cl.[7] .......... A63F 13/00

(52) U.S. Cl. .......... 463/42; 463/20; 463/30; 273/138.2; 273/138.1

(58) Field of Search .......... 463/30–35, 12–13, 463/16–22, 36–38, 42, 41.4; 713/186; 250/336.1–395; 273/138.1, 138.2, 139, 143 R

(56) References Cited

U.S. PATENT DOCUMENTS

| | | | | |
|---|---|---|---|---|
| 4,670,798 | A | 6/1987 | Campbell et al. | 360/12 |
| 4,984,098 | A | 1/1991 | Buntsis | 360/12 |
| 5,117,407 | A | 5/1992 | Vogel | 369/30 |
| 5,264,822 | A | 11/1993 | Vogelman et al. | 340/286.01 |
| 5,320,362 | A | 6/1994 | Bear et al. | 273/440 |
| 5,374,854 | A | 12/1994 | Chen | 307/117 |
| 5,393,074 | A | 2/1995 | Bear et al. | 273/440 |
| 5,485,139 | A | 1/1996 | Tarnovsky | 340/573 |
| 5,521,616 | A | 5/1996 | Capper et al. | 345/156 |
| 5,657,004 | A | 8/1997 | Whittaker et al. | 340/815.45 |
| 5,700,193 | A | 12/1997 | d'Archard Van Enschut | 463/3 |
| 5,726,629 | A | 3/1998 | Yu | 340/565 |
| 5,803,453 | A | 9/1998 | Stephan et al. | 273/138.2 |
| 5,831,527 | A | 11/1998 | Jones, II et al. | 340/540 |
| 5,855,515 | A | 1/1999 | Pease et al. | 463/27 |
| 5,923,252 | A | 7/1999 | Sizer et al. | 340/573.1 |
| 5,970,436 | A | 10/1999 | Berg et al. | 702/177 |
| 6,028,515 | A | 2/2000 | Eisinger | 340/541 |
| 6,298,218 | B1 * | 10/2001 | Lowe et al. | 455/310 |

OTHER PUBLICATIONS

2–page document of KUBE Electronics, Ltd. printed from website www.kube.com on Jun. 21, 2000.

* cited by examiner

*Primary Examiner*—Mark Sager
*Assistant Examiner*—Aaron Capron
(74) *Attorney, Agent, or Firm*—Marshall, Gerstein & Borun LLP

(57) ABSTRACT

A casino gambling unit may include a display unit capable of generating video images, a detection apparatus capable of detecting the presence of a person by detecting radiation from the person, and a controller operatively coupled to the display unit and the detection apparatus. The controller may comprise a processor and a memory and may be programmed to allow a person to make a wager, to cause a video image representing a video gambling game to be generated on the display unit, to determine an outcome of the video gambling game and a value payout associated with the outcome of the video gambling game, and to cause an attract sequence comprising a plurality of video images displayed on the display to be performed in response to detection of the presence of a person.

15 Claims, 16 Drawing Sheets

CASINO GAMBLING APPARATUS WITH PERSON DETECTION

BACKGROUND OF THE INVENTION

The present invention is directed to a casino gambling apparatus, which could be either an individual gambling unit or a casino gambling system having a plurality of gambling units, that is capable of detecting the presence of a person.

A conventional gambling unit has been provided with a display unit that is capable of generating video images, a coin or bill acceptor, and a controller with a memory and a processor that controls the overall operation of the gambling unit. The controller was programmed to allow a person to make a wager, to cause video images to be generated on the display unit, to determine an outcome of the video gambling game, and to determine a value payout associated with the outcome of the video gambling game. The conventional gambling unit was programmed to display video images representing a video gambling game, which included a number of user-selectable video gambling games including video poker, video blackjack, video slots, video keno and video bingo.

The conventional gambling unit was also programmed to cause a screen-saver sequence to be performed on the display unit. The screen-saver sequence included a plurality of video images relating to the game without the generation of sound. The gambling unit would periodically exit the screen-saver sequence to perform an attract sequence, which included a plurality of video images and the generation of one or more sound segments that were designed to attract a player to the gambling unit. If a player deposited a coin or a bill or made another input to the gambling unit during performance of the attract sequence, the gambling unit would terminate the attract sequence and generate another display, such as a game-selection display, to allow the player to begin gambling. The conventional gambling unit also included an instruction sequence that included a plurality of help displays that could be displayed in response to the player pressing a “help” key or similar key.

One example of a prior casing gambling system is disclosed in U.S. Pat. No. 5,855,515 to Pease, et al. The Pease, et al. patent discloses a progressive gaming system having a plurality of individual gambling units that are operatively linked together to allow the generation of a relatively large progressive jackpot that may be won by one of the players using one of the individual gambling units in the progressive system.

SUMMARY OF THE INVENTION

In one aspect, the invention is directed to a casino gambling unit that may include a display unit capable of generating video images, a detection apparatus capable of detecting the presence of a person, and a controller operatively coupled to the display unit and the detection apparatus. The controller may comprise a processor and a memory and may be programmed to allow a person to make a wager, to cause a video image representing a video gambling game to be generated on the display unit, to determine an outcome of the video gambling game and a value payout associated with the outcome of the video gambling game, and to cause an attract sequence comprising a plurality of video images displayed on the display to be performed in response to detection of the presence of a person.

The video image may represent a video gambling game selected from the group of video gambling games consisting of video poker, video blackjack, video slots, video keno and video bingo, in which case the video image may comprise an image of at least five playing cards if the video gambling game comprises video poker; the video image may comprise an image of a plurality of simulated slot machine reels if the video gambling game comprises video slots; the video image may comprise an image of a plurality of playing cards if the video gambling game comprises video blackjack; the video image may comprise an image of a plurality of keno numbers if the video gambling game comprises video keno; and the video image may comprise an image of a bingo grid if the video gambling game comprises video bingo.

The controller may be programmed to cause an attract sequence comprising a plurality of video images and one or more audio segments to be performed in response to detection of the presence of a person. The controller may be programmed to perform a screen-saver sequence and to cause the screen-saver sequence to be terminated and an attract sequence comprising a plurality of video images and one or more audio segments to be performed in response to detection of the presence of a person. The controller may be programmed to perform a screen-saver sequence comprising a plurality of video images without the generation of sound and to cause the screen-saver sequence to be terminated and an attract sequence comprising a plurality of video images and one or more audio segments to be performed in response to detection of the presence of a person.

The detection apparatus may comprise a detection apparatus that is capable of directing radiation towards a person and detecting radiation from the person, and the detection apparatus may comprise a detection apparatus that is capable of detecting when a person is within a given distance of the gambling unit.

The invention is also directed to a casino gambling method that may comprise detecting the presence of a person, causing an attract sequence comprising the generation of one or more sound segments or one or more video images to be performed in response to detecting the presence of the person, allowing a person to make a wager, causing a video gambling game image to be generated, determining an outcome of the video gambling game represented by the video gambling game image, and determining a value payout associated with the outcome of the video gambling game.

In another aspect, the invention is directed to a casino gambling system that may comprise a first gambling unit, a second gambling unit, a third gambling unit, and a central controller operatively coupled to the gambling units. Each of the gambling units may include a display unit that is capable of generating video images, a detection apparatus capable of detecting a direction of movement of a person, and a gambling unit controller operatively coupled to the display unit and the detection apparatus. Each gambling unit controller may have a processor and a memory and may be programmed to allow a person to make a wager, to cause a video image associated with a video gambling game to be generated on the display unit, and to determine an outcome and a value payout for the video gambling game.

The central controller may comprise a processor and a memory and may be programmed to receive a first signal from the first gambling unit in response to the detection apparatus of the first gambling unit detecting movement of a person in a first direction, to receive a second signal from the first gambling unit in response to the detection apparatus of the first gambling unit detecting movement of a person in a second direction, to transmit a response signal to the second gambling unit in response to receipt of the first signal from the first gambling unit to cause the second gambling unit to perform an operation, and to transmit a response signal to the third gambling unit in response to receipt of the second signal from the first gambling unit to cause the third gambling unit to perform an operation.

In a further aspect, the invention is directed to a casino gambling system that may comprise a first gambling unit, a second gambling unit, and a central controller operatively coupled to the first and second gambling units. The central controller may have a processor and a memory and may be programmed to receive a person-detect signal from the first gambling unit in response to the detection apparatus of the first gambling unit detecting the presence of a person, and to transmit a response signal to the second gambling unit to cause the second gambling unit to perform an operation in response to detection of the person by the detection apparatus of the first gambling unit.

The central controller may be programmed to cause the second gambling unit to perform an attract sequence comprising a plurality of video images and/or one or more sound segments in response to detection of the person by the detection apparatus of the first gambling unit. The second gambling unit may have a gambling unit controller that is programmed to perform a screen-saver sequence that may comprise a plurality of video images with or without the generation of sound, and the central controller may be programmed to cause the second gambling unit to terminate the screen-saver sequence and to initiate an attract sequence in response to detection of the person by the detection apparatus of the first gambling unit.

The features and advantages of the present invention will be apparent to those of ordinary skill in the art in view of the detailed description of various embodiments, which is made with reference to the drawings, a brief description of which is provided below.

DETAILED DESCRIPTION OF VARIOUS EMBODIMENTS

Figure 1:
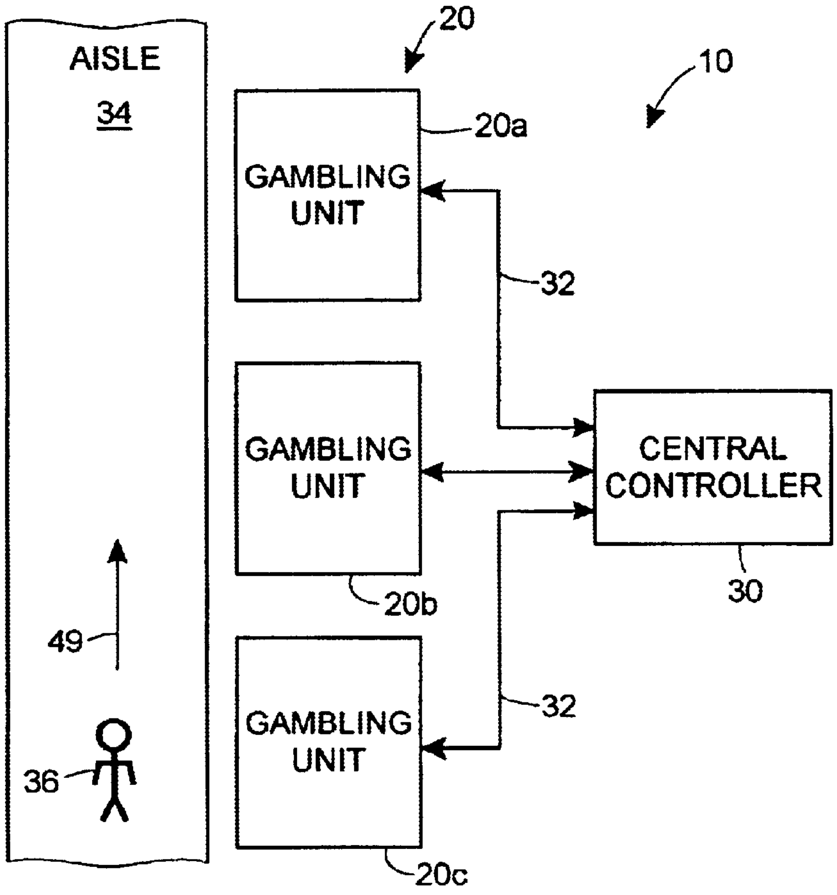
FIG. 1 is a perspective view of an embodiment of a casino gambling system in accordance with the invention.

FIG. 1 illustrates one possible embodiment of a casino gambling system 10 in accordance with the invention. Referring to FIG. 1, the casino gambling system 10 may include a plurality of gambling units 20, including a first gambling unit 20*a*, a second gambling unit 20*b*, and a third gambling unit 20*c*. Although three gambling units 20 are shown, more gambling units could be included in the system 10. Each of the gambling units 20 may be connected to a central computer or controller 30 via a respective data link 32, which may provided as a dedicated hardwired link or a wireless link. Although three separate data links 32 are shown in FIG. 1, the data links 32 could be provided in the form of a single bus or network which may could be connected to the central controller 30 and to each of the gambling units 20.

FIG. 1 illustrates the gambling units 20 positioned in a linear fashion along a walkway or aisle 34 along which one or more persons schematically shown at 36 could walk or stroll. Each of the gambling units 20 could be assigned an identification number for purposes of data communications between the central controller 30 and the gambling units 20. For example, the gambling unit 20*a* could be assigned number 001, the gambling unit 20*b* could be assigned number 002, and the gambling unit 20*c* could be assigned number 003. Each of the gambling units 20 could be considered to be either upstream or downstream of the other gambling units 20. For example, the gambling units 20*b* and 20*c* could be considered downstream from the gambling unit 20*a*. Determining whether a gambling unit 20 is upstream or downstream from another gambling unit 20 could be based on identification numbers assigned to the gambling units 20. For example, a gambling unit 20 having a larger identification number could be considered downstream from a gambling unit 20 having a smaller identification number.

Figure 2:
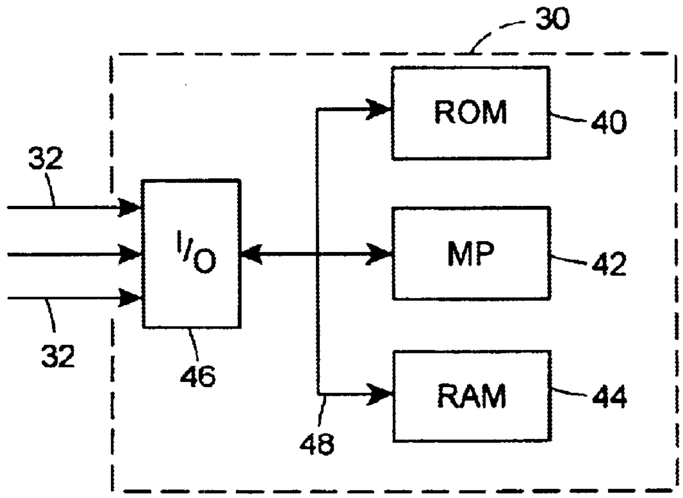
FIG. 2 is a block diagram of the electronic components of the central controller shown schematically in FIG. 1.

FIG. 2 is a block diagram of one embodiment of the controller 30 shown schematically in FIG. 1. Referring to FIG. 2, the controller 30 may include a read-only memory (ROM) 40, a microcontroller or microprocessor (MP) 42, a random-access memory (RAM) 44 and an input/output (I/O) circuit 46, all of which may be interconnected via an address/data bus 48. It should be appreciated that although only one microprocessor 42 is shown, the controller 30 could include multiple microprocessors 42. Similarly, the memory of the controller 30 could include multiple RAMs 44 and multiple ROMs 40. Although the I/O circuit 46 is shown as a single block, it should be appreciated that the I/O circuit 46 could include a number of different types of I/O circuits. The RAM(s) 44 and ROM(s) 40 could be implemented as semiconductor memories, magnetically readable memories, and/or optically readable memories, for example.

Overall Operation of Gambling System 10

Each gambling unit 20 may detect a person sitting or standing in front of one of the gambling unit 20, and each gambling unit 20 may detect movement of a person relative to the gambling unit 20, such as movement of a person walking or strolling along the aisle 34. Upon detecting a stationary person or movement of a person, each gambling unit 20 may generate a detection and/or movement signal and communicate such signal(s) to the central controller 30 via its associated communication link 32. Each gambling unit 20 may alter its operation or perform an operation in response to detecting the presence of a person without interaction with the central controller 30.

For example, if the person 36 were walking along the aisle 34 in a direction indicated by the arrow 49, the movement of the person 36 along the aisle 34 and the direction in which the person 36 was walking could be detected by the gambling unit 20*c*, and the gambling unit 20*c* could transmit to the central controller 30 detection data representing the movement and direction of the person 36 along the aisle 34. In response to receiving that detection data, the central controller 30 could cause the gambling unit 20*a* and/or the gambling unit 20*b* to generate an attract sequence in an attempt to induce the person 36 to play one of the gambling units 20*a*, 20*b*. That attract sequence could include, for example, a plurality of video images and/or one or more sound segments such as audible music segments or voice segments.

Operation of Central Controller 30

Figure 3:
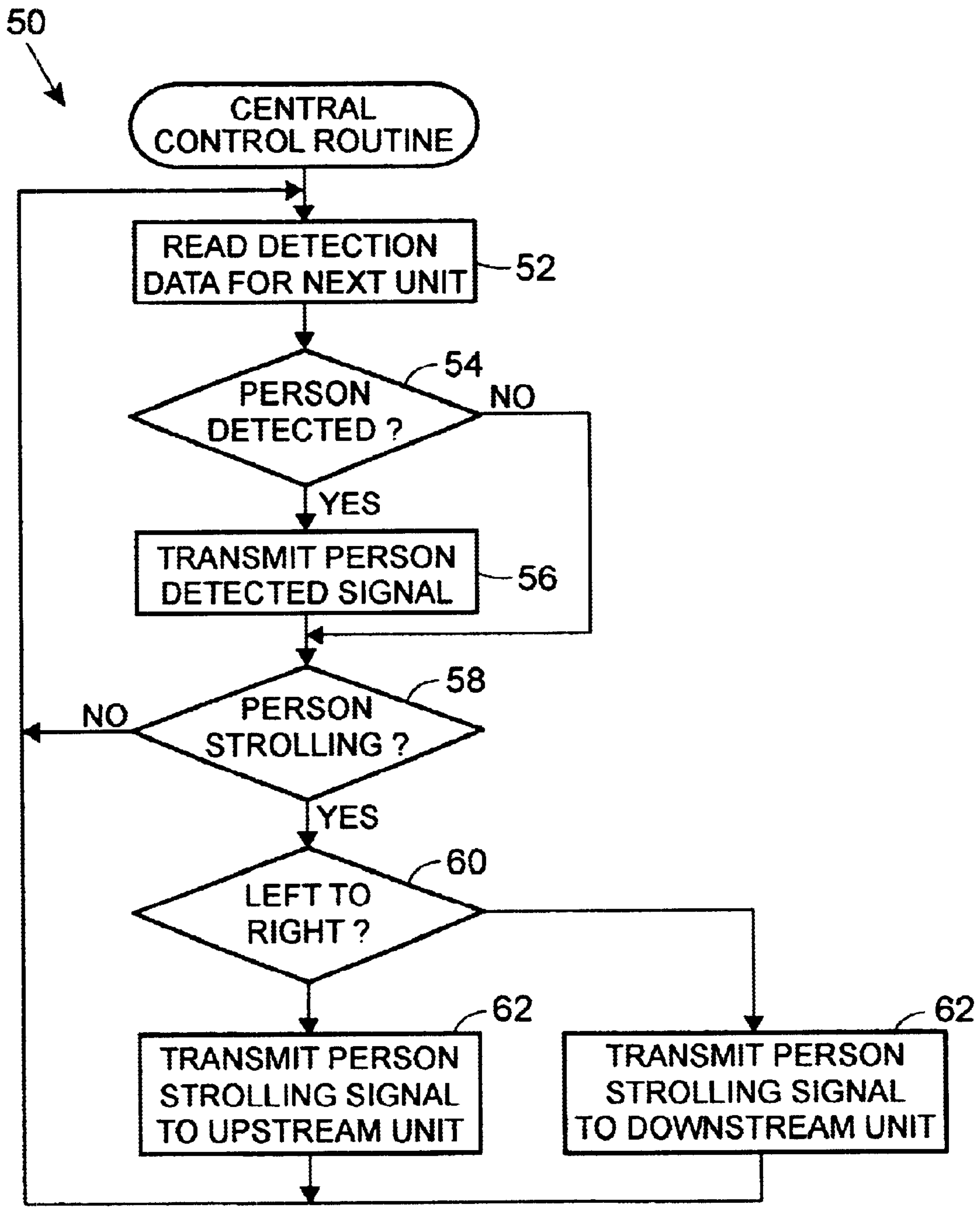
FIG. 3 is a flowchart that illustrates one manner in which the central controller could operate.

FIG. 3 is a flowchart of one possible operational routine 50 that may be performed by the central controller 30 shown in FIG. 1. Referring to FIG. 3, the central controller 30 may periodically read digital detection data that was previously transmitted to the central controller 30 by each of the gambling units 20 and take corresponding action, depending on the detection data read.

At block 52, the central controller 30 may read the digital detection data previously transmitted to it by one of the gambling units 20, such as the gambling unit 20*a*. That detection data may include, for example, a person-detect signal or data indicating that the gambling unit 20*a* has detected the presence of a person, a person-moving signal or data indicating that the gambling unit 20*a* has detected movement of a person, and/or a direction signal or data indicating the direction in which the person was moving. At block 54, if the detection data indicated that a person was detected, the central controller 30 could transmit a response signal, such as a person-detected signal, to the gambling unit 20 that detected the presence of the person at block 56.

At block 58, if the detection data read at block 52 indicates that a person was strolling along the aisle 34, the central controller 30 may determine the direction in which the person was moving at block 60 based on the detection data previously read at block 52. If the person was moving in a first direction, the central controller 30 may transmit at block 62 a "person-strolling" signal to a gambling unit 20 upstream of the gambling unit 20 that detected the movement of the person. In this case, the "upstream" gambling unit 20 could be a gambling unit located ahead of the person.

For example, referring to FIG. 1, if the gambling unit unit 20*c* detected movement of the person 36 in the direction indicated by the arrow 49, the central controller 30 could transmit the person-strolling signal to the gambling unit 20*a* and/or the gambling unit 20*b*. In response to receiving that person-strolling signal, the gambling unit 20*a* and/or gambling unit 20*b* could perform an attract sequence like the one described above to attempt to induce the person 36 to play one of the gambling units 20*a*, 20*b*.

Referring back to FIG. 3, if the person was moving in a second direction as determined at block 60, the central controller 30 may transmit at block 64 a "person-strolling" signal to a gambling unit 20 downstream of the gambling unit 20 that detected the movement of the person. In this case, the "downstream" gambling unit 20 could also be a gambling unit ahead of the person.

Gambling Units 20

Figure 4:
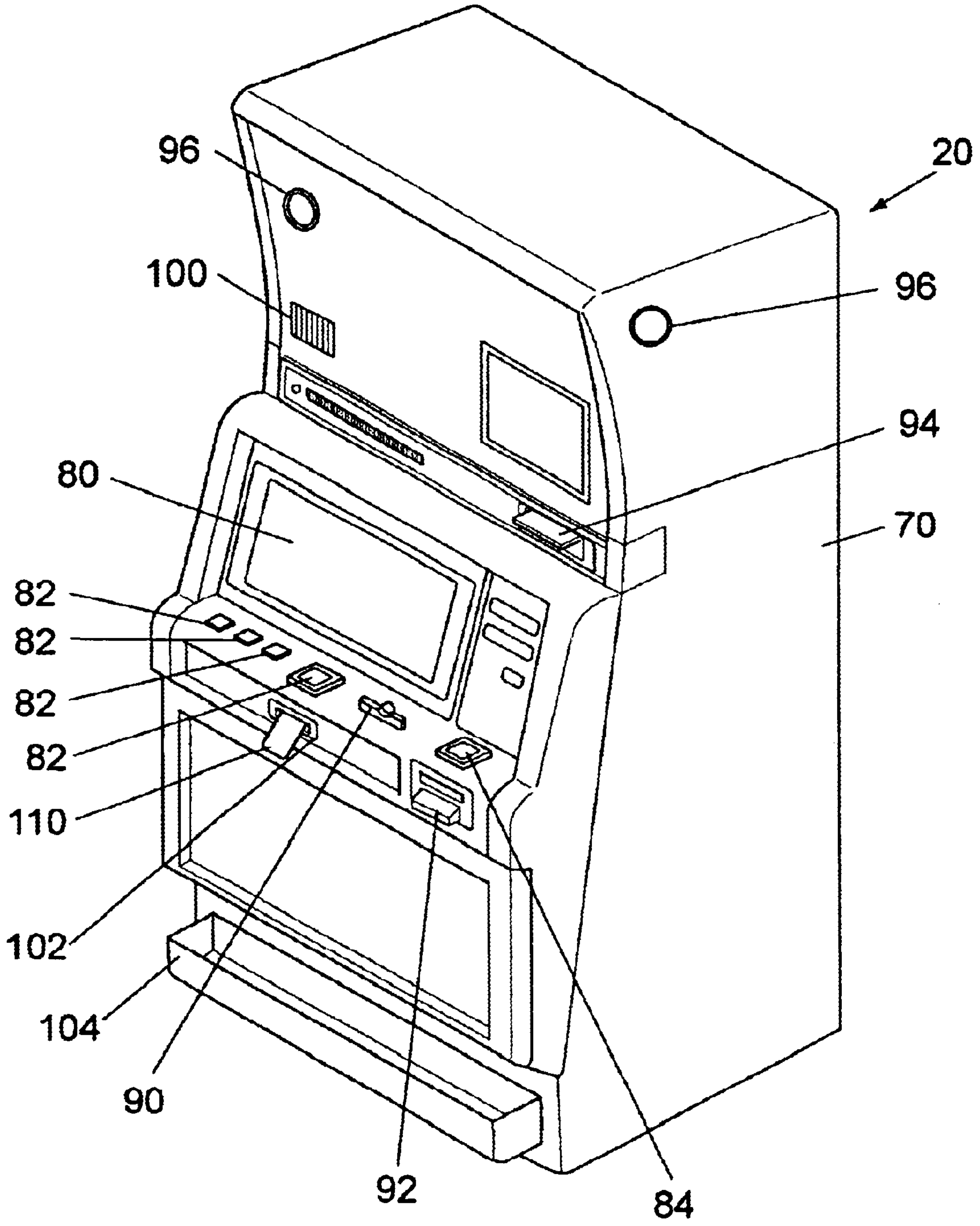
FIG. 4 is a perspective view of an embodiment of a casino gambling unit in accordance with the invention.

FIG. 4 illustrates an embodiment of a gambling unit 20 in accordance with the invention. Referring to FIG. 1, the gambling unit 20 may be any type of casino gambling unit and may have various different structures and methods of operation. For exemplary purposes, a particular type of gambling unit 20 is described below, but it should be understood that numerous other types may be utilized.

Referring to FIG. 4, the casino gambling unit 20 may include a cabinet 70, a color display unit 80 disposed on the front of the cabinet 70 for displaying graphics and information associated with one or more video gambling games that a casino customer may play. The gambling unit 20 may also include a variety of input devices, such as a plurality of buttons 82 that a customer may actuate to make wagers and game-specific selections such as hold or discard decisions, a video slots spin button 84, and/or any other type of input device.

The casino gambling unit 20 may include a variety of currency- or value-accepting mechanisms that may be disposed on the front of the gambling unit 20 or in any other suitable location. The value-accepting mechanisms may include any device that can accept value from a customer. As used herein, the term "value" may encompass gambling tokens, coins, paper currency, ticket vouchers, and any other suitable object representative of value. For example, the value-accepting mechanisms may include a coin acceptor 90 that accepts coins or tokens; a bill acceptor 92 that accepts and validates paper currency; a card or ticket reader 94 that accepts coupons, credit cards, printed cards, smart cards, ticket vouchers, etc.; and any other device that may accept a medium of value.

The gambling unit 20 may include additional features to enhance a player's game-playing experience, such as one or more audio speakers 96, a sound-generating circuit 98 (FIG. 5), and an aroma dispenser 100. The audio speakers 96 may generate audio representing sounds such as the noise of spinning slot machine reels, a dealer's voice, music, announcements or any other suitable audio related to a video gambling game. The aroma dispenser 100, which may be mounted above the display unit 80 or in any other suitable location on the gambling unit 20, may be manufactured by MicroScent or DigiScents. The gambling unit 20 may also include a printer 102 disposed on the front of the gambling unit 20 or in any other suitable location. The printer 102 may be used, for example, to print the ticket vouchers 110 as described below. The gambling unit 20 may also include a payout tray 104 of the type provided on slot machines, for example.

Ticket Vouchers 110

Figure 6:
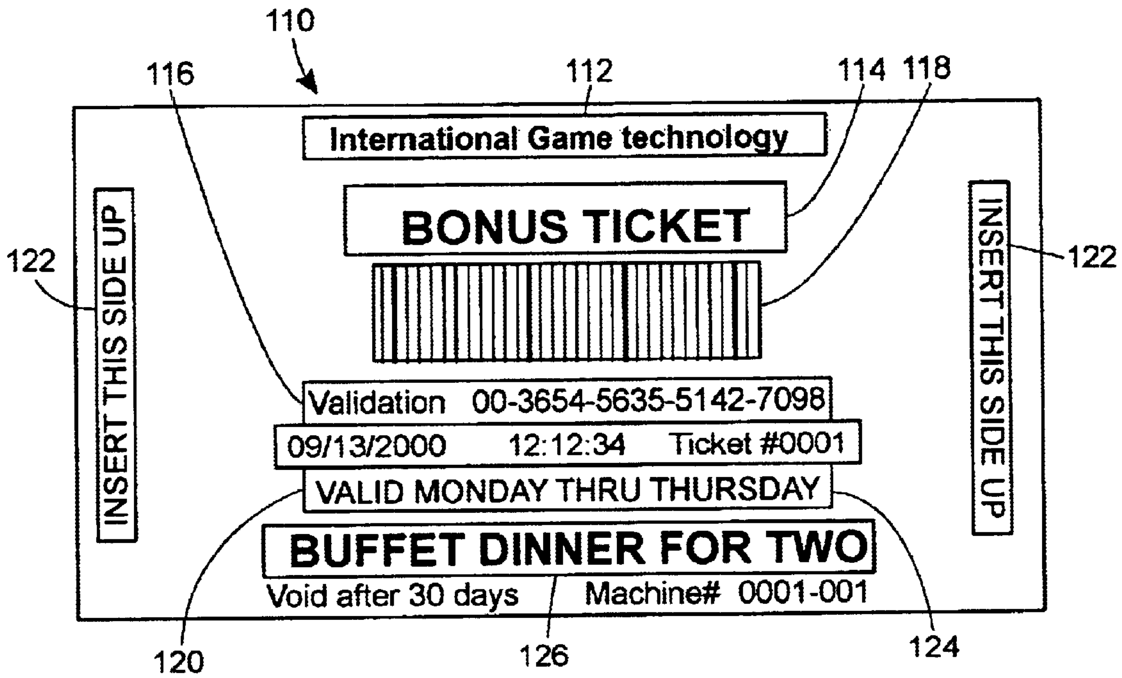
FIG. 6 is an illustration of one embodiment of a ticket used in connection with the gambling unit of FIG. 4.

FIG. 6 illustrates one possible example of a ticket voucher 110 that may be printed by the gambling units 20. Referring to FIG. 6, the ticket voucher 110 may be composed of paper or another printable material and may have printed information including the casino name 112, the type of ticket voucher 114, a validation number 116, a bar code 118 with control and/or security data, the date and time of issuance 120, redemption instructions 122 and restrictions 124, a description of an award 126, and any other information that may be necessary or desirable. Different types of ticket vouchers could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers could be printed with an optically readable material such as ink, or data on the ticket vouchers could be magnetically encoded.

Gambling Unit Electronics

Figure 5:
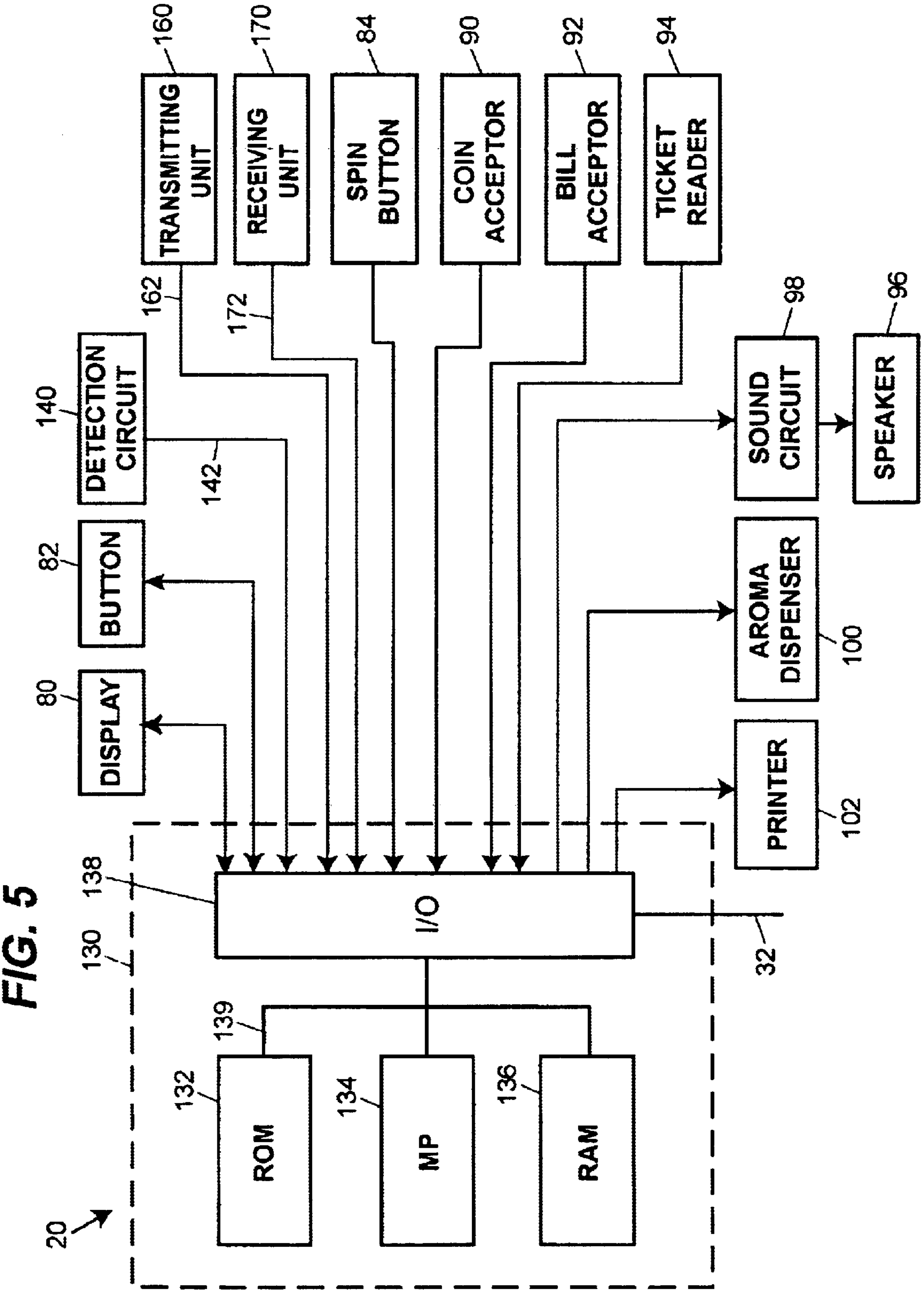
FIG. 5 is a block diagram of the electronic components of the casino gambling unit of FIG. 4.

FIG. 5 is a block diagram of a number of components that may be incorporated in the gambling unit 20. Referring to FIG. 5, the gambling unit 20 may include a controller 130 that may comprise a read-only memory (ROM) 132, a microcontroller or microprocessor (MP) 134, a random-access memory (RAM) 136 and an input/output (I/O) circuit 138, all of which may be interconnected via an address/data bus 139. It should be appreciated that although only one microprocessor 134 is shown, the controller 130 could include multiple microprocessors 134. Similarly, the memory of the controller 130 could include multiple RAMs 136 and multiple ROMs 132. Although the I/O circuit 138 is shown as a single block, it should be appreciated that the I/O circuit 138 could include a number of different types of I/O circuits. The RAM(s) 134 and ROM(s) 132 could be implemented as semiconductor memories, magnetically readable memories, and/or optically readable memories, for example.

FIG. 5 also illustrates that the components shown in FIG. 4 could be connected to the I/O circuit 138 via a respective direct line or conductor. Different connection schemes could be used. For example, one or more of the components shown in FIG. 5 could be connected to the I/O circuit 138 via a common bus or other data link that is shared by a number of components. Furthermore, some of the components could be directly connected to the microprocessor 134 without passing through the I/O circuit 138.

Detection Circuits

As shown in FIG. 5, the gambling unit 20 may also include a detection circuit 140 , which may be coupled to the I/O circuit 138 via a multi-signal line 142. The detection circuit 140 may detect the presence of a person, such as a stationary person and/or a moving person, and/or the direction in which the person is moving. The detection circuit 140 may be any type of detection circuit, such as an ultrasonic detection circuit, an infrared detection circuit, a Doppler detection circuit, etc. The detection circuit 140 may operate based on sensing radiation from a person, in which case the detection circuit may transmit a beam towards a person and detected radiation reflected from the person or in which case the detection circuit may sense radiation from person without transmitting radiation towards the person. As used herein, the term "radiation" is intended to be broadly construed to include, but not be limited to, heat, visible light, non-visible light, infrared and ultrasonic waves, acoustic energy, etc.

Figure 9:
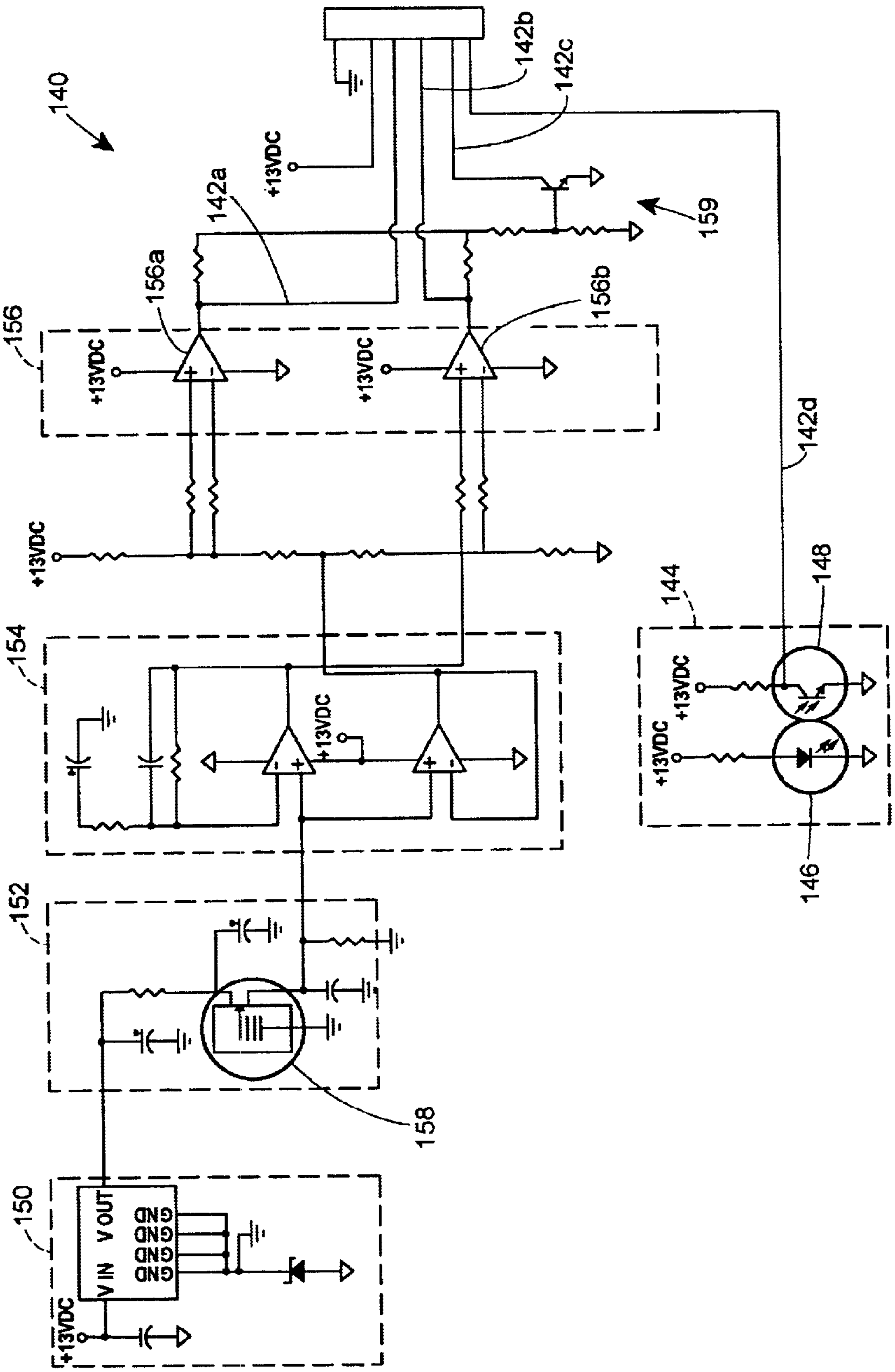
FIG. 9 is a circuit diagram of one embodiment of a detection circuit shown schematically in FIG. 5.

FIG. 9 is a circuit diagram of one possible embodiment of the detection circuit 140 shown schematically in FIG. 5. Referring to FIG. 9, the detection circuit 140 may include a circuit 144 that is capable of detecting the presence of a non-moving person. For example, the circuit 144 may detect when a person is within a predetermined distance of the gambling unit 20, when a person is standing in front of the gambling unit 20, and/or when a person is seated in front of the gambling unit 20. The detection circuit 144 may include an infrared LED 146 that emits infrared radiation from the front of the gambling unit 20 and a photodetector 148 that generates a signal on a line 142*d* in response to detecting radiation of an intensity greater than a given threshold.

The detection circuit 140 may also include a circuit (shown in the upper half of FIG. 9) that is capable of detecting the presence and movement of a person and the direction in which the person is moving. That circuit may include a power supply circuit 150, such as a regulated power supply circuit, a detector circuit 152, an amplifier/buffer circuit 154, and a comparator circuit 156.

The detector circuit 152 may include a motion detector 158, such as a model LH1878 motion detector marketed by EG&G Heimann. That particular motion detector has a first field of vision (e.g. a right-hand field of vision) and a second field of vision (e.g. a left-hand field of vision), and two capacitive elements that are sensitive to temperature, one element for the right field of vision and one element for the left field of vision. That detector generates a positive pulse in response to detecting a person in one of its fields of vision and a negative pulse in response to detecting a person in the other of its fields of vision. Thus, the detector is capable of detecting the stationary presence of a person in one of its fields of vision and movement of a person from one of its fields of vision to the other. The response of that Heimann detector is such that it is not capable of detecting relatively quick movement of a person, such as a person walking quickly by the gambling unit 20. In such a case, that may be unimportant or undesirable since a quickly walking person may not be interested in playing the gambling unit 20. The amplifier circuit 154 may be provided with a relatively high AC gain and a relatively low DC gain to reject the situation where a person is detected but is not moving. The amplifier circuit 154 may act as a bandpass filter to cause frequencies outside of a bandpass range to be filtered out.

The comparator circuit 156 may be provided with a first comparator 156*a* designed to detect the presence of a pulse of one polarity (e.g. positive), which would correspond to the detection of a person in one field of vision of the Heimann detector, and a second comparator 156*b* designed to detect the presence of a pulse of opposite polarity (e.g. negative), which would correspond to the detection of a person in the other field of vision of the Heimann detector.

The output of the comparator 156*a* may generate on a line 142*a* a signal indicating the detection of a person in one field of vision of the Heimann detector, and the output of the comparator 156*b* may generate on a line 142*b* a signal indicating the detection of a person in the other field of vision of the Heimann detector. By comparing which of the signals is generated first, the controller 130 of the gambling 20 may determine the direction in which the person is moving.

The signals generated by the comparators 156a, 156b may be provided to an OR circuit 159 that determines when either of the comparators 156a, 156b generates a signal on one of the lines 142a, 142b, in which case the OR circuit 159 generates a signal indicating the detection of a person on a line 142c.

Figure 7:
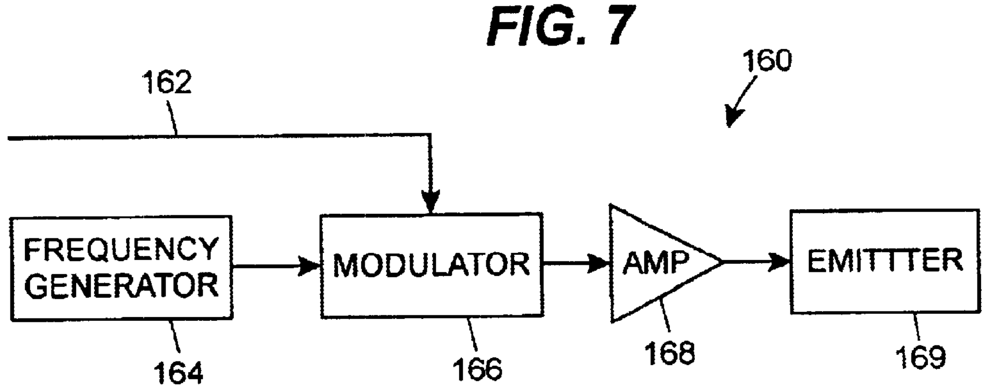
FIG. 7 is a block diagram of one embodiment of a transmitting unit shown schematically in FIG. 5.

Referring to FIG. 5, instead of or in addition to the detection circuit 140, the gambling unit 20 may include a detection circuit having a transmitting unit 160, which may be coupled to the I/O circuit 138 via a line 162. Referring to FIG. 7, the transmitting unit 160 may include a frequency generator 164, a modulator circuit 166, an amplifier circuit 168 and a radiation emitter 169. The modulator circuit 166, which may be controlled by the gambling unit controller 130 via the line 162, may change the frequency (divide up or down) generated by the frequency generator 164 and may control when the output of the frequency generator 164 is transmitted to the amplifier circuit 168.

Figure 8:
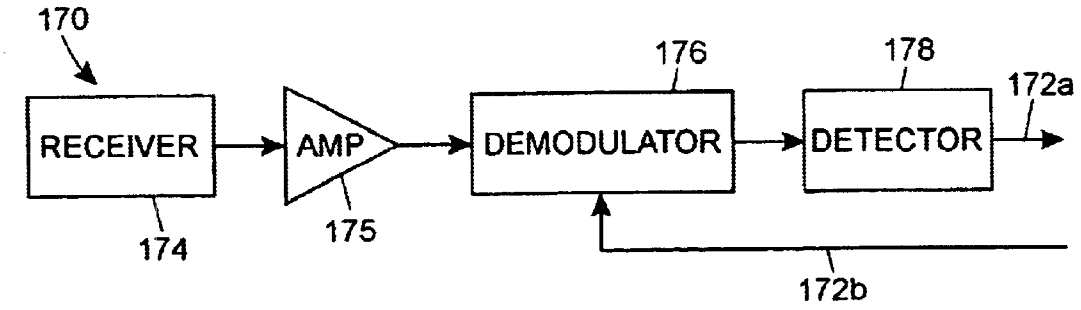
FIG. 8 is a block diagram of one embodiment of a receiving unit shown schematically in FIG. 5.

Referring to FIG. 5, the detection circuit described above may include a receiving unit 170, which may be coupled to the I/O circuit 138 via a multi-wire line 172. Referring to FIG. 8, the receiving unit 170 may include a transducer or receiver 174 capable of detecting radiation received from or reflected from a person, an amplifier circuit 175, a demodulator circuit 176 which may be controlled by the gambling unit controller 130 via a line 172b, and a detector circuit 178 that may generate a person-detect signal, a person-moving signal, and/or a movement direction signal to the gambling unit controller 130 via a line 172a. The emitter 169 and the receiver 174 may be of various designs and constructions, such as infrared, ultrasonic, Doppler, acoustic, etc.

The transducer components of the detection circuits described above that emit and detect radiation, such as the components 146, 148, 158, 169, 174, may be mounted to a front housing portion of the gambling unit 20 in order to detect the presence of persons walking or positioned, such as sitting or standing, in front of the gambling unit 20. The components may be mounted behind a plate of glass or another structure that does not significantly impair their operation.

Overall Operation of Gambling Unit

One manner in which the gambling unit 20 may operate is described below in connection with a number of flowcharts which represent a number of portions or routines of one or more computer programs, which may be stored in one or more of the memories of the controller 130. The computer program(s) or portions thereof may be stored remotely, outside of the gambling unit 20, and may control the operation of the gambling unit 20 from a remote location. Such remote control may be facilitated with the use of a wireless connection, or by an Internet interface (not shown) that connects the gambling unit 20 with a remote computer (not shown) having a memory in which the computer program portions are stored via the Internet. The computer program portions may be written in any high level language such as C, C+, C++ or the like or any low-level, assembly or machine language. By storing the computer program portions therein, various portions of the memories 132, 136 are physically configured, either magnetically (e.g. in the case of a magnetic memory), electrically (e.g. in the case of a semiconductor memory) or structurally (e.g. in the case of an optical memory), in accordance with computer program instructions.

Figure 10:
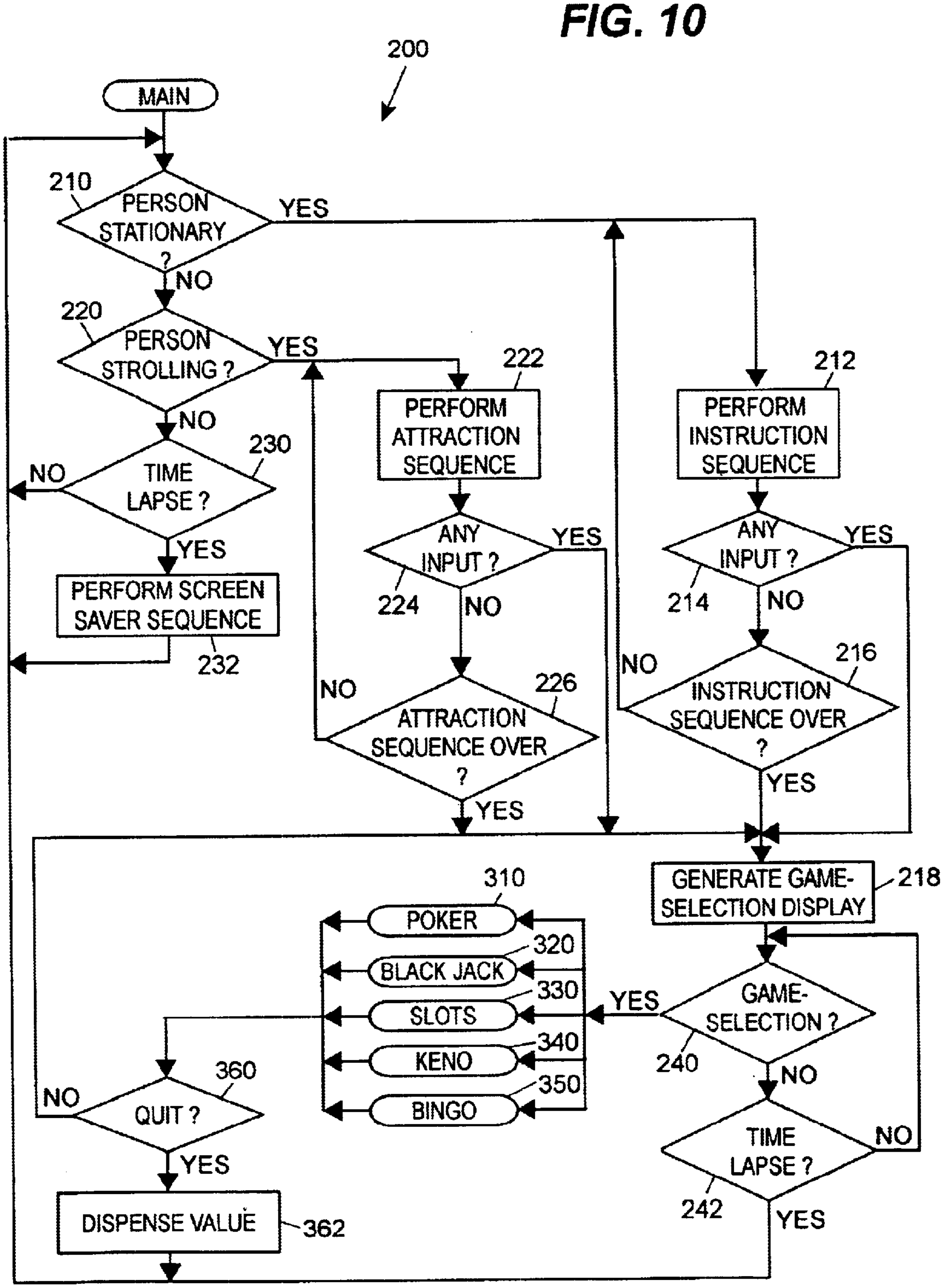
FIG. 10 is a flowchart of a main routine that may be performed by the controller shown in FIG. 5.

FIG. 10 is a flowchart of a main operating routine 200 that may be stored in the memory of the controller 130. Referring to FIG. 10, the main routine 200 may begin operation at block 210 which may determine whether the presence of a person who is not moving has been detected. For example, a person may be sitting or standing directly in front of the gambling unit 20.

In that case, an instruction sequence may be performed at block 212. The instruction sequence may be performed by displaying one or more video images on the display unit 80 and causing one or more sound segments, such as voice or music, to be generated via the speakers 96. The video images of the instruction sequence may contain instructions on how to use the gambling unit 20 and how to play various casino gambling games such as video poker, video blackjack, video slots, video keno, and/or video bingo.

During performance of the instruction sequence, if the person makes any input to the gambling unit 20 as determined at block 214, the instruction sequence may be terminated and a game-selection display may be generated on the display unit 80 at block 218 to allow the person to select a game available on the gambling unit 20. The game-selection display may include, for example, a list of video gambling games that may be played on the gambling unit 20 and/or a visual message to prompt the person to deposit value into the gambling unit 20 via one of the value-accepting devices 90, 92, 94. The gambling unit 20 may detect an input at block 214 in various ways. For example, the gambling unit 20 could detect if the person presses any button on the gambling unit 20; the gambling unit 20 could determine if the person deposited one or more coins into the gambling unit 20; the gambling unit 20 could determine if person deposited paper currency into the gambling unit; etc. In the absence of input as determined at block 214 and if the instruction sequence has been completed as determined at block 216, the game-selection display may be generated at block 218.

At block 220, if a strolling person has been detected, the gambling unit 20 may perform an attraction sequence at block 222. As described above, a strolling person may be detected in front of another gambling unit 20, which may cause an upstream or downstream gambling unit 20 to perform the attraction sequence. In such a case, the gambling unit 20 may determine whether a person is strolling at block 220 by checking for a person-strolling signal transmitted to the gambling unit 20 by the central controller 30. Alternatively, the gambling unit 20 could check for a command signal from the central controller 30 that commands the gambling unit 20 to perform an attraction sequence promptly. As another alternative, the gambling unit 20 could determine the presence of a strolling person via a detection circuit incorporated into the gambling unit 20, without relying on a signal from the central controller 30.

In any case, an attraction sequence may be performed at block 222 in an attempt to induce a strolling person to play the gambling unit 20. The attraction sequence may be performed by displaying one or more video images on the display unit 80 and/or causing one or more sound segments, such as voice or music, to be generated via the speakers 96. The attraction sequence may include a scrolling list of games that may be played on the gambling unit 20 and/or video images of various games being played, such as video poker, video blackjack, video slots, video keno, video bingo, etc.

During performance of the attraction sequence, if the person makes any input to the gambling unit 20 as determined at block 224, the attraction sequence may be terminated and a game-selection display may be generated on the display unit 80 at block 218 to allow the person to select a game available on the gambling unit 20. In the absence of input as determined at block 224 and if the attraction sequence has been completed as determined at block 226, the game selection display may be generated at block 218.

If there is no stationary person as determined at block 210 and no strolling person as determined at block 220, the gambling unit 20 may determine at block 230 whether a given period of time has lapsed. The given time lapse period may be, for example, a time period in which no input of any type has been received by a person. If there has been a time lapse, a screen-saver sequence may be initiated at block 232. The screen-saver sequence may comprises a plurality of different video images without the generation of sound. The video images may correspond to one or more casino games such as poker, blackjack, video slots, video keno or bingo.

In response to the game-selection display generated at block 218, the gambling unit 20 may wait for the person to make a game selection. Upon selection of one of the games by the person as determined at block 240, the controller 30 may cause one of a number of gambling game routines to be performed to allow the player to play the selected game. For example, the game routines could include a video poker routine 310, a video blackjack routine 320, a video slots routine 330, a video keno routine 340, and a video bingo routine 350. If no selection is made within a given period of time as determined at block 242, the operation may branch back to block 210.

It should be noted that although five video gambling routines are shown in FIG. 10, a different number of routines could be included to allow play of a different number of gambling games. Alternatively, the gambling unit 20 may be programmed to allow play of only one type of gambling game. The gambling unit 20 may also be programmed to allow play of different games, such as a slot machine with mechanical wheels.

After one of the routines 310, 320, 330, 340, 350 has been performed to allow the player to play one of the games, block 360 may be utilized to determine whether the player wishes to terminate play on the gambling unit 20 or to select another game. If the player wishes to stop playing the gambling unit 20, which wish may be expressed, for example, by selecting a quit graphic displayed on the display unit 80 or through another input device, the controller 130 may dispense value to the player at block 362, based on the outcome of the games played by the player. The operation may then return to block 210 to start the main routine 200 again. If the player did not wish to quit as determined at block 360, the program may branch back to block 218 where the game-selection display may again be generated to allow the player to select another game.

Video Poker

Figure 11:
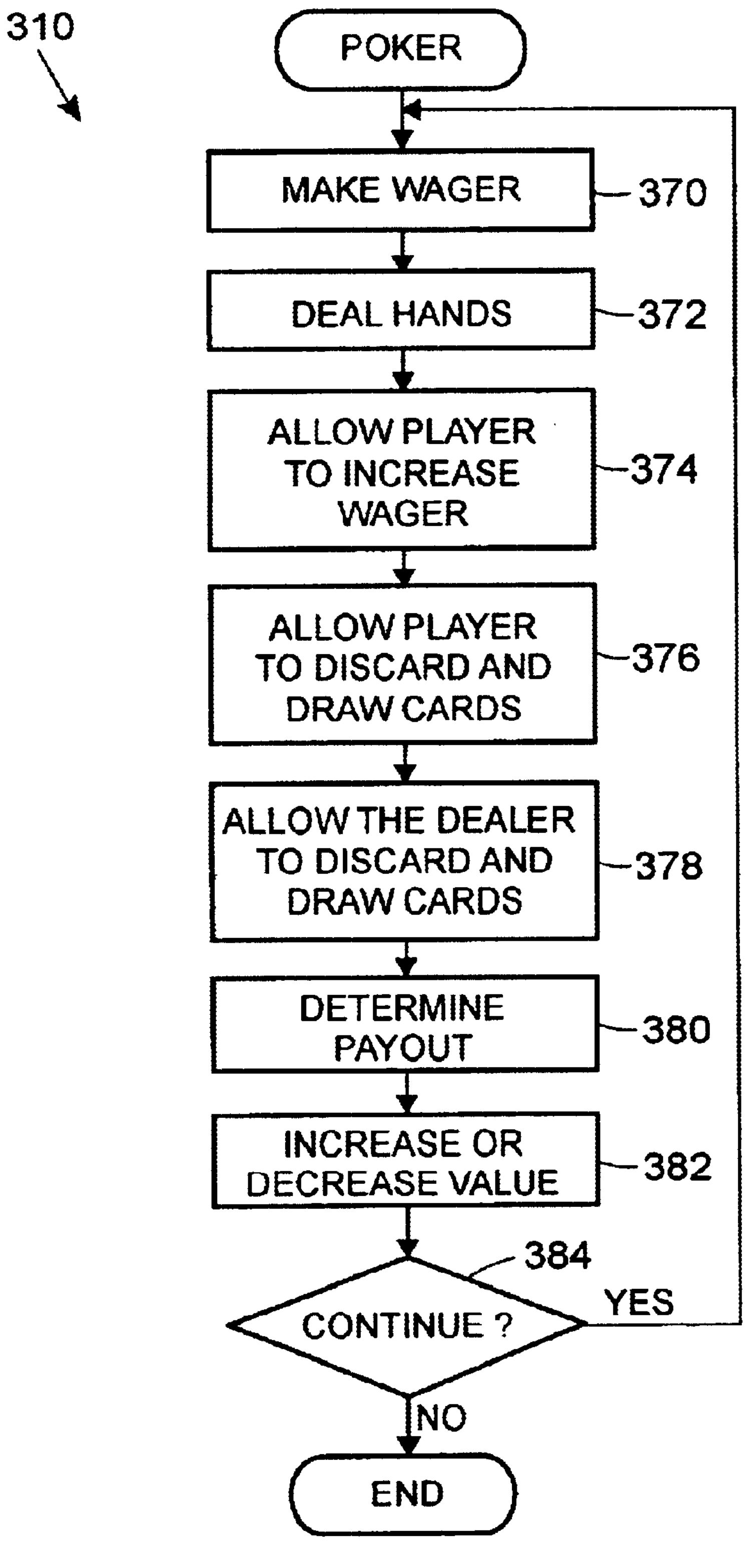
FIG. 11 is a flowchart of video poker routine that may be performed by the controller of FIG. 5.

FIG. 11 is a flowchart of the video poker routine 310 shown schematically in FIG. 10. Referring to FIG. 11, at block 370 the controller 130 may cause a display to be generated on the display unit 80 to prompt the player to make a wager. After a wager is entered, the controller 130 may cause a pair of virtual poker hands of cards to be "dealt" to the player and to the dealer at block 372 by causing the display unit 80 to display the virtual hands. After the virtual hands have been "dealt," the player may have an opportunity at block 374 to increase the initial wager made at block 370. At block 376, the player may be allowed to discard and draw new cards in an attempt to improve the player's poker hand, and at block 378 the dealer (which may be, for example, the gambling unit 20) may be allowed to discard and draw new cards in an attempt to improve the dealer's poker hand.

At block 380, the controller 130 may determine the outcome of the poker game and a corresponding payout. If the player has won the game (i.e. the player's hand is better than the dealer's hand), the payout will be positive. If the player has not won the game, the player may forfeit the wager(s) made at blocks 370 and/or 374. At block 382, the controller 130 may increase or decrease the player's value based on the results of the poker game as determined at block 380. At block 384, the controller 130 may cause a message to be displayed on the display unit 80 asking whether the player desires to continue playing the video poker game. If so, the routine may branch back to block 370. If not, the poker routine 310 may end and the controller 130 may cause block 360 of FIG. 10 to be performed.

Figure 12:
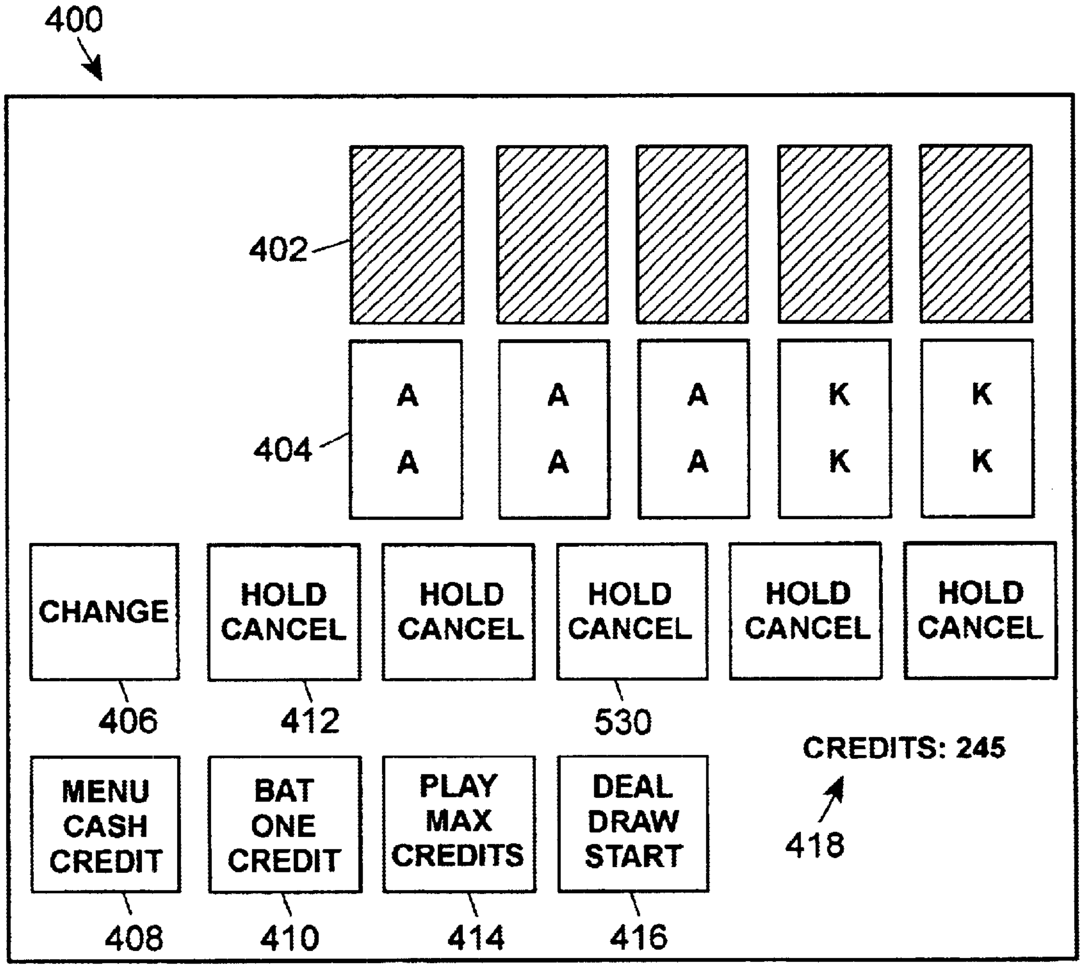
FIG. 12 is an illustration of a visual display that may be displayed when the controller of FIG. 5 performs the play video poker routine of FIG. 11.

FIG. 12 illustrates an exemplary display 400 that may be shown on the display unit 80 during performance of the video poker routine 310. Referring to FIG. 12, the display 400 may include video images representative of a plurality of cards 402 in a dealer's hand, which may be shown face down, and a plurality of cards 404 in a player's hand, which may be shown face up. To allow the player to control the play of the video poker game, a plurality of player-selectable button graphics may be displayed. For example, button graphics for change 406, menu/cash/credit 408 and bet one credit 410 may be displayed. Further, button graphics for hold/cancel 412 may be displayed, each of which may pertain to a particular one of the player's cards 404. Button graphics for play max credits 414 and deal/draw/start 416 may also be displayed. A graphic 418 representing the number of player credits may also be displayed to inform the player of the number of credits that he or she has remaining. The display 80 may comprise a touch-sensitive screen to allow the player to select any of the button graphics described above, by touching them with a finger, for example.

Video Blackjack

Figure 13:
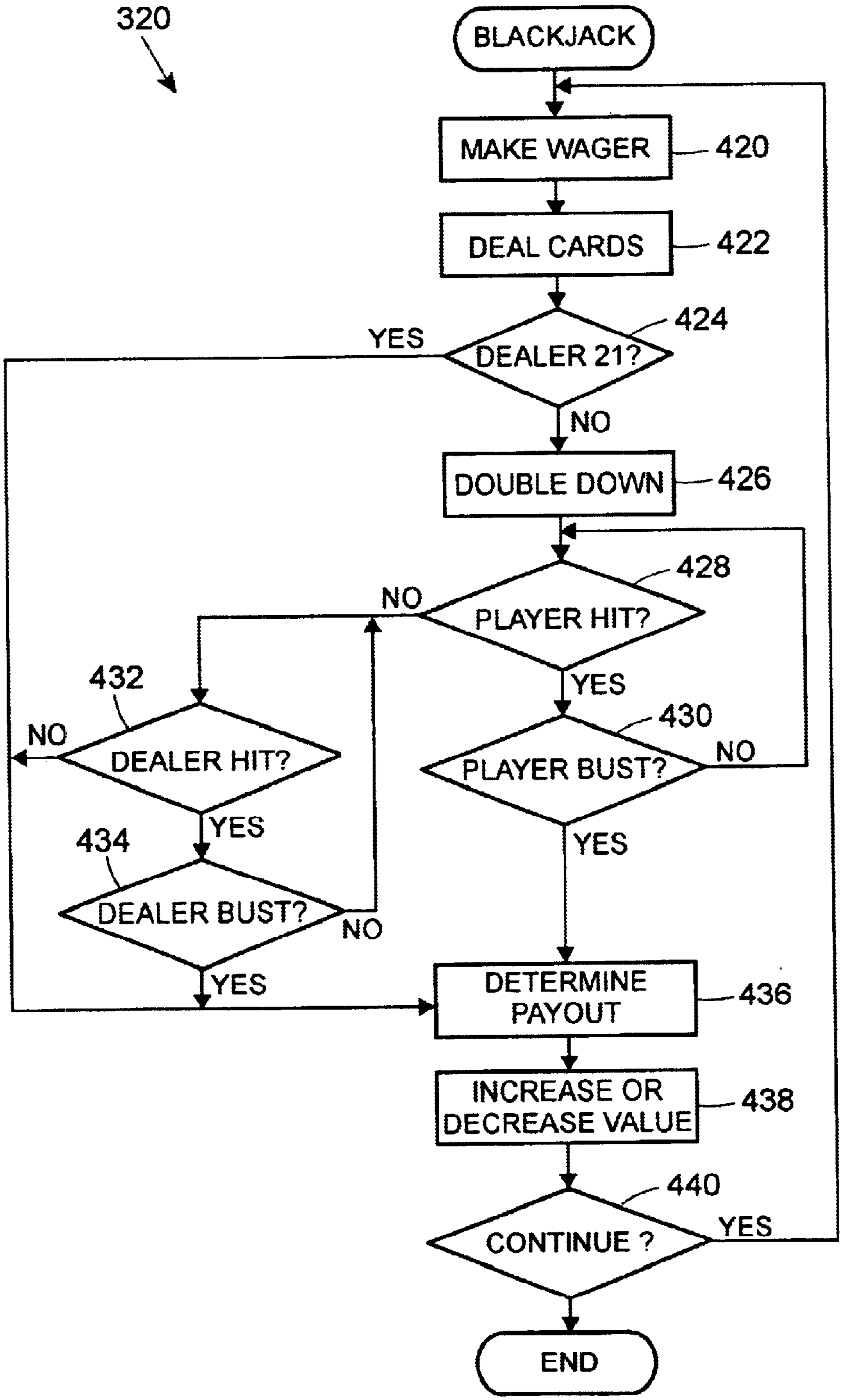
FIG. 13 is a flowchart of video blackjack routine that may be performed by the controller of FIG. 5.

FIG. 13 is a flowchart of the video blackjack routine 320 shown schematically in FIG. 10. Referring to FIG. 13, the video blackjack routine 320 may begin at block 420 at which a player may make a wager on the outcome of the blackjack game. After the player has made a wager, at block 422 the controller 130 may cause virtual cards to be "dealt" to both the player and the dealer (which may be the gambling unit 20), against which the player is playing.

After the cards are dealt, at block 424 the controller 130 may determine whether the dealer has a hand that totals 21. If the dealer's hand is not 21, at block 426 the controller 130 may cause the display unit 80 to generate a display asking whether the player would like to double down. At block 428, the controller 130 may allow the player to be "hit" (i.e. dealt an additional virtual card). If the player is hit, block 430 may determine if the player has "bust" (i.e. has exceeded 21). If the player has not bust, block 428 may be performed again to allow the player to be "hit" again.

If the player decides not to hit, at block 432 the controller 130 may determine whether the dealer wants to be hit. If the dealer hits, at block 434 the controller 130 may determine whether the dealer has bust. If the dealer has not bust, block 432 may be performed again to allow the dealer to be "hit" again. If the dealer decides not to hit, at block 436 the controller 130 may determine the outcome of the blackjack game and a corresponding payout. For example, the controller 130 may determine which of the player or the dealer has the higher hand that does not exceed 21.

At block 438, the controller 130 may increase or decrease the player's value based on the results of the blackjack game as determined at block 436. At block 440, the controller 130 may cause a message to be displayed on the display unit 80 asking whether the player desires to continue playing the video blackjack game. If so, the routine may branch back to block 420. If not, the blackjack routine 320 may end and the controller 130 may cause block 360 of FIG. 10 to be performed.

Figure 14:
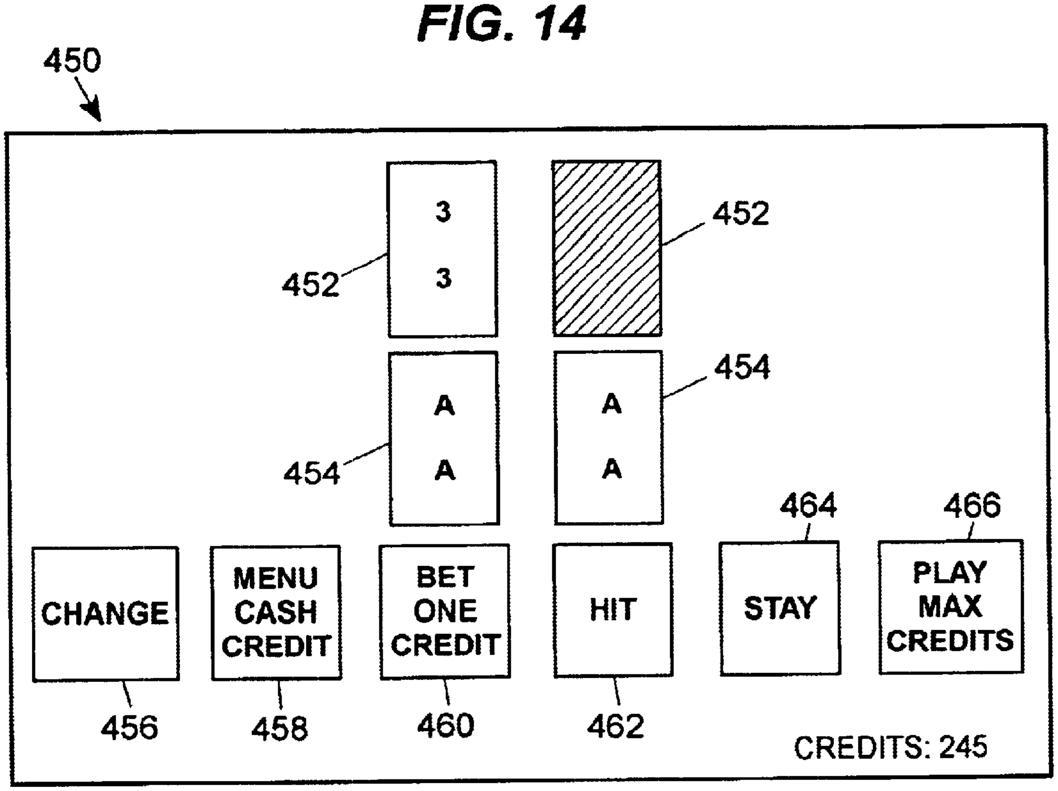
FIG. 14 is an illustration of a visual display that may be displayed when the controller of FIG. 5 performs the video blackjack routine of FIG. 13.

FIG. 14 illustrates an exemplary display 450 that may be shown on the display unit 80 during performance of the video blackjack routine 320. Referring to FIG. 14, the display 450 may include video images representative of a plurality of cards 452 that form a dealer's blackjack hand and a plurality of cards 454 that form the player's blackjack hand. To allow the player to control the play of the video blackjack game, a plurality of player-selectable button graphics may be displayed. For example, button graphics for change 456, menu/cash/credit 458, bet one credit 460, hit 462, stay 464 and/or play max credits 466 may be provided.

Video Slots

Figure 16:
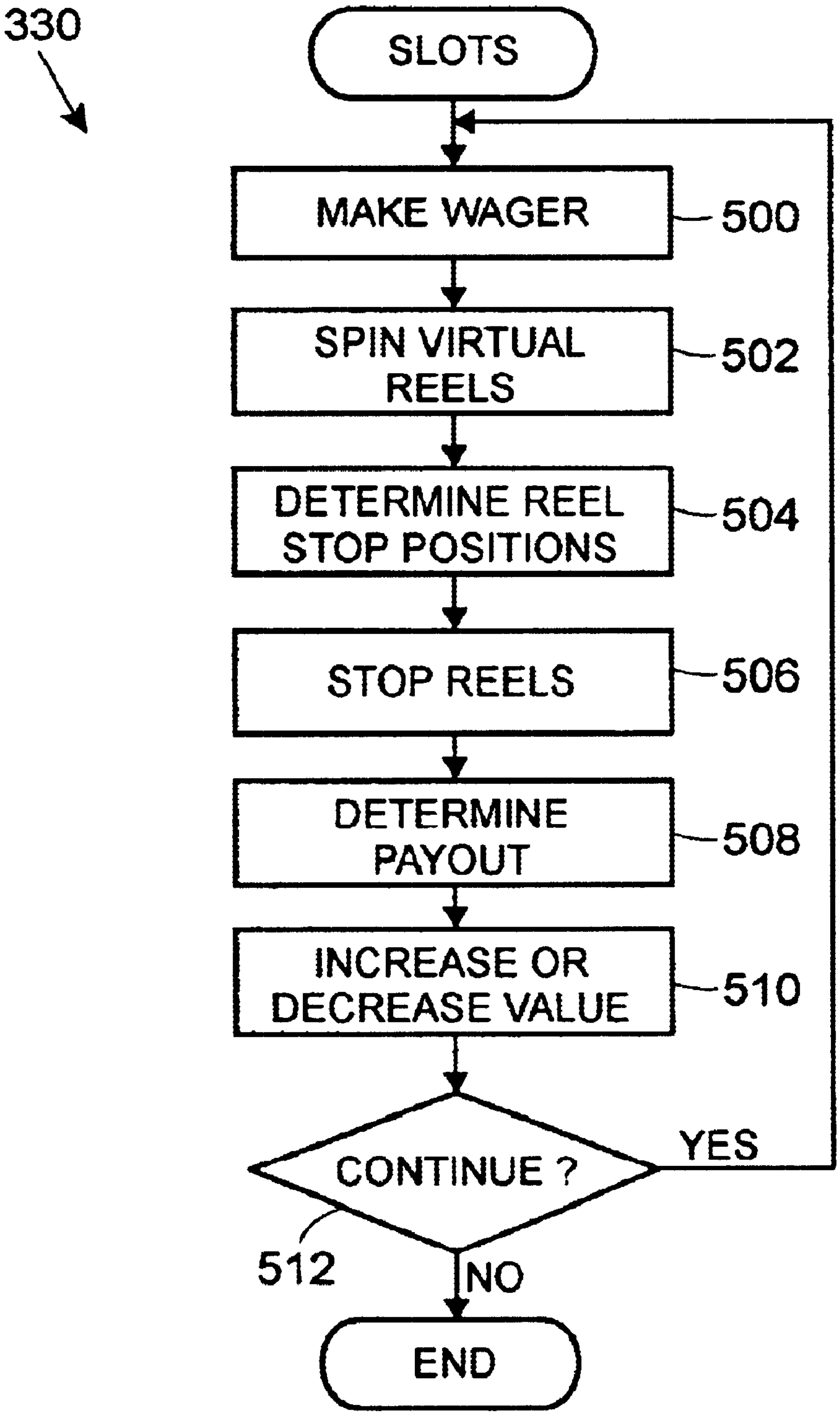
FIG. 16 is a flowchart of a video slots routine that may be performed by the controller of FIG. 5.

FIG. 16 is a flowchart of the video slots routine 330 shown schematically in FIG. 10. Referring to FIG. 16, the video slots routine 330 may begin at block 500 at which a player may make a wager. After the player has made a wager, at block 502 the controller 130 may cause an image of a plurality of spinning slot machine wheels to be generated on the display unit 80. While the virtual reels are spinning, at block 504 the controller 130 may determine the symbols on which the various virtual reels are to be stopped, such as by randomly selecting one or more numbers from which the reel stop positions are determined. At block 506, the controller 130 may cause the display unit 80 to display a sequence of images that simulate the sequential stopping of each of the virtual reels. The virtual reels may be stopped from left to right, from the perspective of the player, or in any other manner or sequence. At block 508, the controller 130 may evaluate the game outcome based on the positions at which the virtual reels stopped and determine the payout to which the player is entitled. For example, if a virtual reels have stopped on high payout symbols, the player may receive a large payout. If, however, the virtual reels have stopped on symbols having no payout, the player loses the money that was wagered at block 500.

At block 510, the controller 130 may increase or decrease the player's value based on the results of the video slots game as determined at block 508. At block 512, the controller 130 may cause a message to be displayed on the display unit 80 asking whether the player desires to continue playing the video slots game. If so, the routine may branch back to block 500. If not, the video slots routine 330 may end and the controller 130 may cause block 360 of FIG. 10 to be performed.

Figure 15:
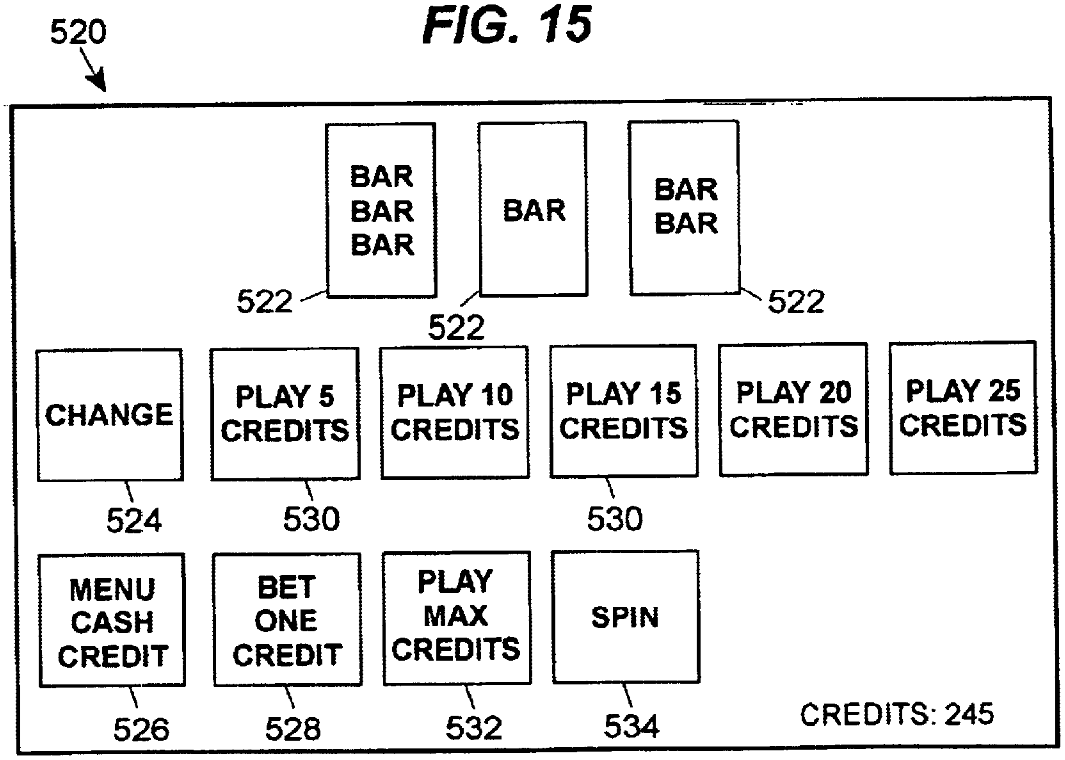
FIG. 15 is an illustration of a visual display that may be displayed when the controller of FIG. 5 performs the video slots routine of FIG. 16.

FIG. 15 illustrates an exemplary display 520 that may be shown on the display unit 80 during performance of the video slots routine 330. Referring to FIG. 15, the display 520 may include video images representative of a plurality of virtual slot machine reels 522. While three such virtual slot machine reels 522 are shown in FIG. 15, it should be understood that any number of virtual reels could be used. To allow the player to control the play of the video slot machine, a plurality of player-selectable button graphics may be displayed. For example, button graphics for change 524, menu/cash/credit 526, bet one credit 528, bet various numbers of credits 530, play max credits 532, and/or spin reels 534 may be displayed.

Video Keno

Figure 17:
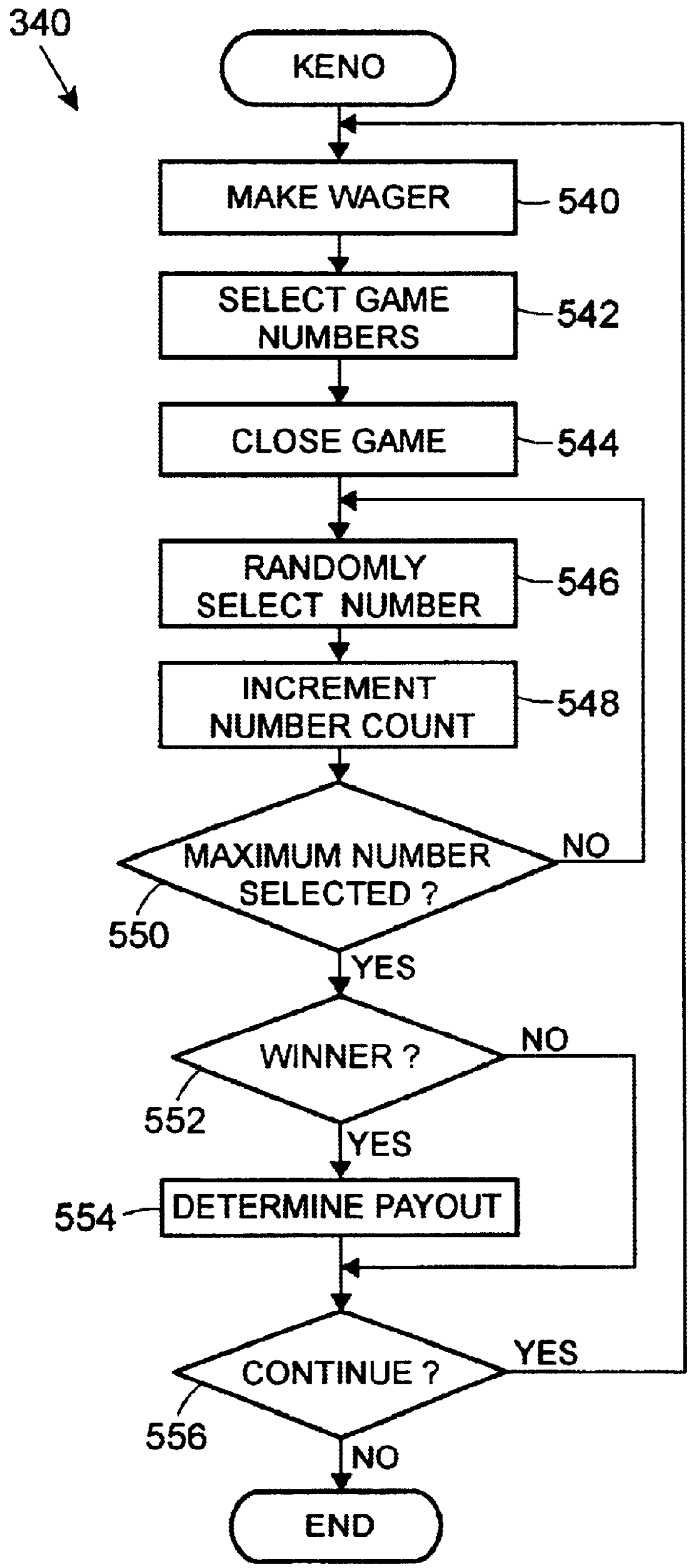
FIG. 17 is a flowchart of a video keno routine that may be performed by the controller of FIG. 5.

FIG. 17 is a flowchart of the video keno routine 340 shown schematically in FIG. 10. The keno routine 340 may be utilized in connection with a single gambling unit 20 where a single player is playing a keno game, or the keno routine 340 may be utilized in connection with multiple gambling units 20 where multiple players are playing a single keno game. In the latter case, one or more of the acts described below may be performed either by the controller 130 in each gambling unit or by the central computer 30 to which multiple gambling units 20 are operatively connected, such as by a network or other data link, for example.

Referring to FIG. 17, the video keno routine 340 may begin at block 540 at which a player makes a wager on the outcome of the keno game. After the player has made a wager, at block 542 the player may select one or more game numbers, which may be within a range set by the casino. After being selected, the player's game numbers may be stored in the memory of the controller 130.

At block 544, after a certain amount of time, the keno game may be closed to additional players (where a number of players are playing a single keno game using multiple gambling units 20) and/or additional game numbers for a single player. At block 546, a game number within a range set by the casino may be randomly selected either by the controller 130 or a central computer operatively connected to the controller. The randomly selected game number may be displayed on the display unit 80 and the display units 80 of other gambling units 20 (if any) which are involved in the same keno game. At block 548, the controller 130 (or the central computer noted above) may increment a count which keeps track of how many game numbers have been selected at block 546.

At block 550, the controller 130 (or the central computer noted above) may determine whether a maximum number of game numbers within the range have been randomly selected. If not, another game number may be randomly selected at block 546. If the maximum number of game numbers has been selected, at block 552 the controller 130 (or a central computer) may determine whether there are a sufficient number of matches between the game numbers selected by the player and the game numbers randomly selected at block 546 to cause the player to win. The number of matches may depend on how many numbers the player selected and the particular keno rules being used.

If there are a sufficient number of matches, a payout may be determined at block 554 to compensate the player for winning the game. The payout may depend on the number of matches between the game numbers selected by the player and the game numbers randomly selected at block 546. At block 556, the controller 130 may cause a message to be displayed on the display unit 80 asking whether the player desires to play another keno game. If so, the routine may branch back to block 540. If not, the keno routine 340 may end and the controller 130 may cause block 360 of FIG. 10 to be performed.

Figure 18:
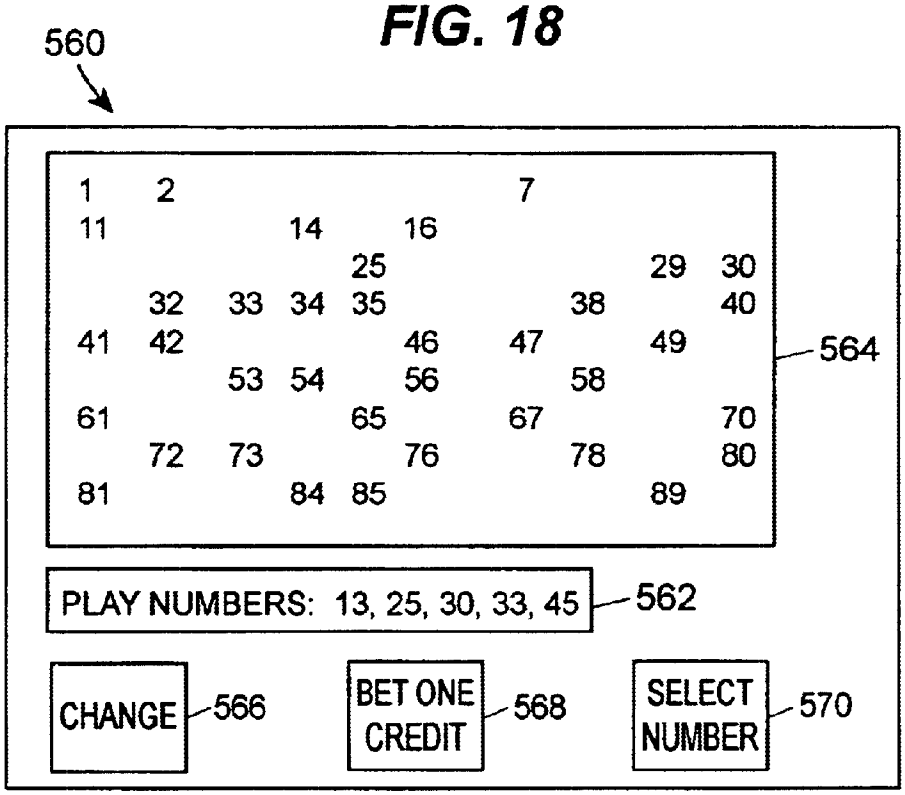
FIG. 18 is an illustration of a visual display that may be displayed when the controller of FIG. 5 performs the video keno routine of FIG. 17.

FIG. 18 illustrates an exemplary display 560 that may be shown on the display unit 80 during performance of the video keno routine 340. Referring to FIG. 18, the display 560 may include a video image 562 of a plurality of numbers that were selected by the player and a video image 564 of the randomly numbers randomly selected during the keno game. The randomly selected numbers may be displayed in a grid pattern. To allow the player to control the play of the keno game, a plurality of player-selectable button graphics may be displayed, such as a change graphic 566, a bet-one-credit graphic 568, and a select number graphic 570.

Video Bingo

Figure 20:
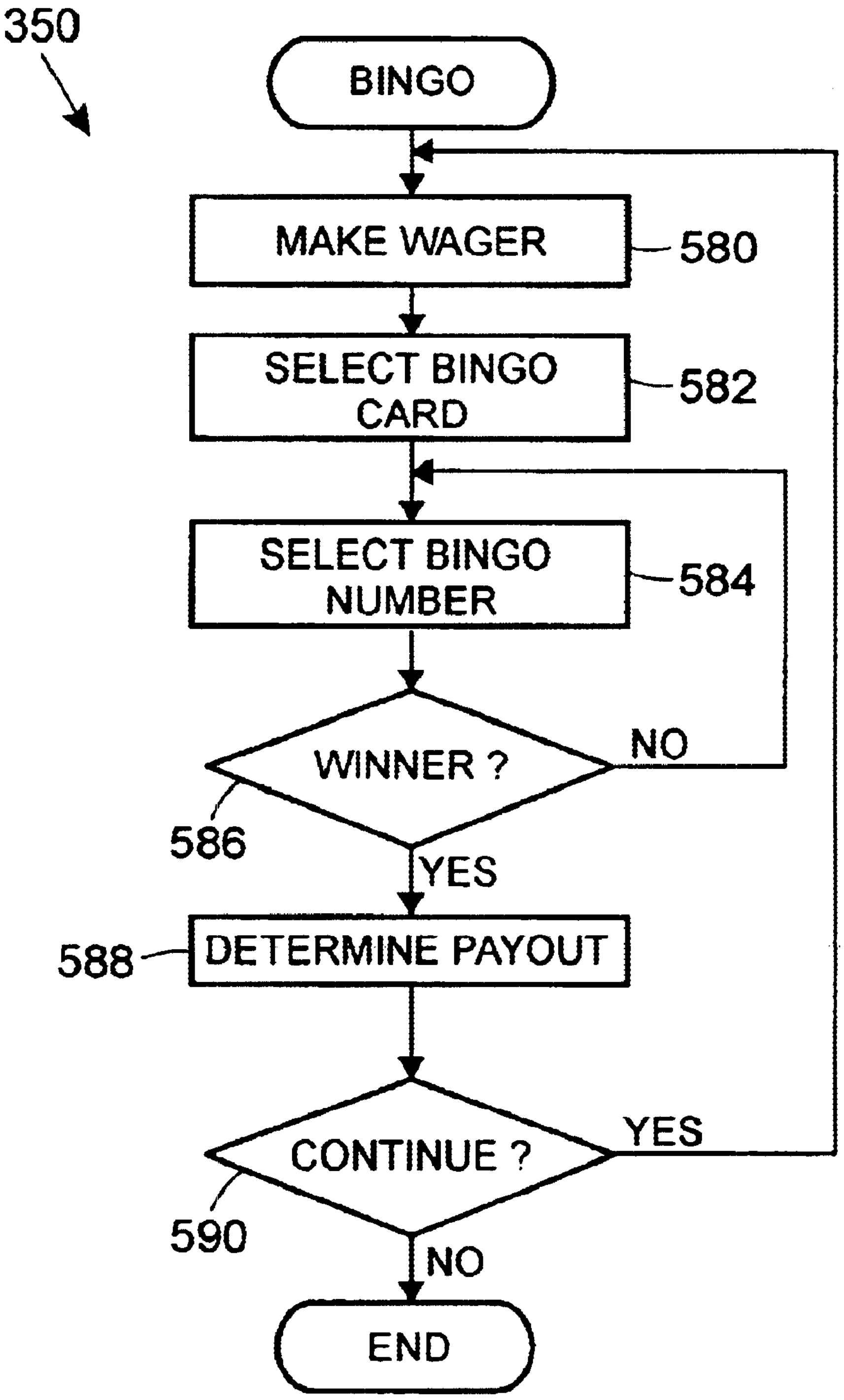
FIG. 20 is a flowchart of a video bingo routine that may be performed by the controller of FIG. 5.

FIG. 20 is a flowchart of the video bingo routine 350 shown schematically in FIG. 10. The bingo routine 350 may be utilized in connection with a single gambling unit 20 where a single player is playing a bingo game, or the bingo routine 350 may be utilized in connection with multiple gambling units 20 where multiple players are playing a single bingo game. In the latter case, one or more of the acts described below may be performed either by the controller 130 in each gambling unit 20 or by the central computer 30 to which multiple gambling units 20 are operatively connected, such as by a network or other data link, for example.

Referring to FIG. 20, at block 580 the controller 130 may prompt a player to make a wager on the outcome of the bingo game by causing a message to be displayed on the display unit 80. At block 582, the player may select a bingo card, which may be generated randomly. The player may select more than one bingo card, and there may be a maximum number of bingo cards that a player may select. At block 584, a bingo number may be randomly generated by the controller 130 or a central computer. The bingo number may be communicated to the display unit 80 and to the display units 80 of any other gambling units 20 involved in the bingo game.

At block 586, the controller 130 (or a central computer) may determine whether the player has won according to any set of bingo rules. If no player has won, another bingo number may be randomly selected at block 584. At block 586, if a player has bingo (which may be determined by the controller 130), at block 588 a payout for the winning player may be determined. The payout may depend on the number of random numbers that were drawn before there was a winner, the total number of winners (if there was more than one player), and the amount of money that was wagered on the game.

Figure 19:
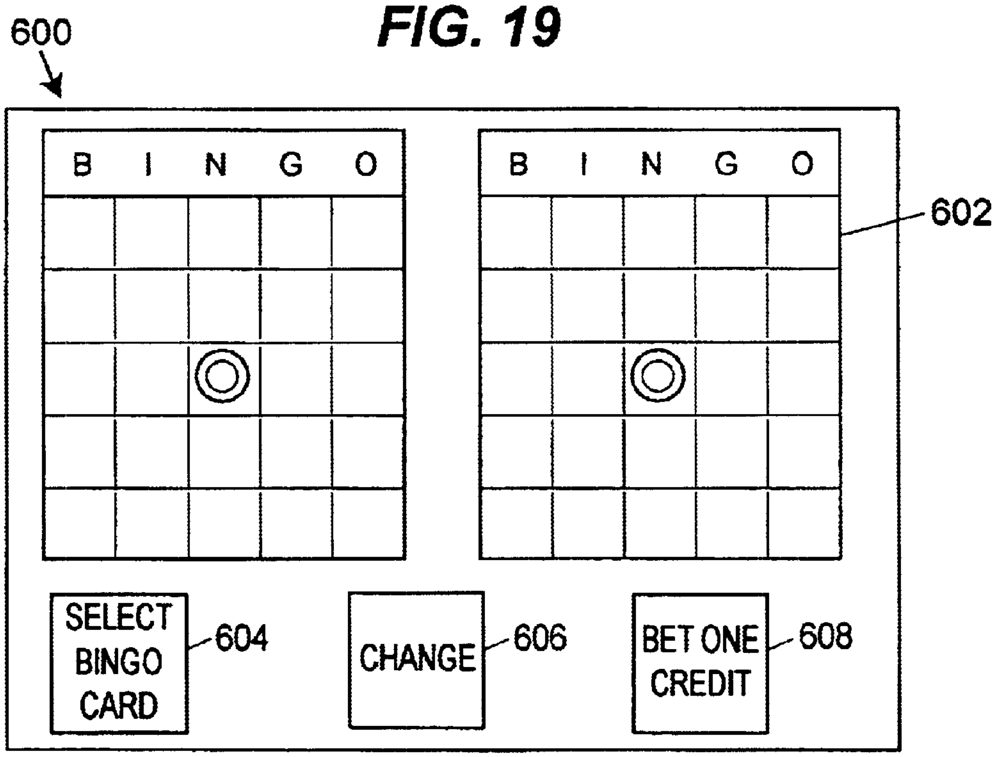
FIG. 19 is an illustration of a visual display that may be displayed when the controller of FIG. 5 performs the video bingo routine of FIG. 20.

FIG. 19 illustrates an exemplary display 600 that may be shown on the display unit 80 during performance of the video bingo routine 350. Referring to FIG. 19, the display 600 may include a video image 602 of one or more bingo cards and images of the bingo numbers selected during the game. The bingo cards may have a grid pattern. To allow the player to control the play of the video bingo game, a plurality of user-selectable button graphics may be displayed, such as a select bingo card graphic 604, a change graphic 606, and/or a bet one credit graphic 608.

General Casino Game

Figure 21:
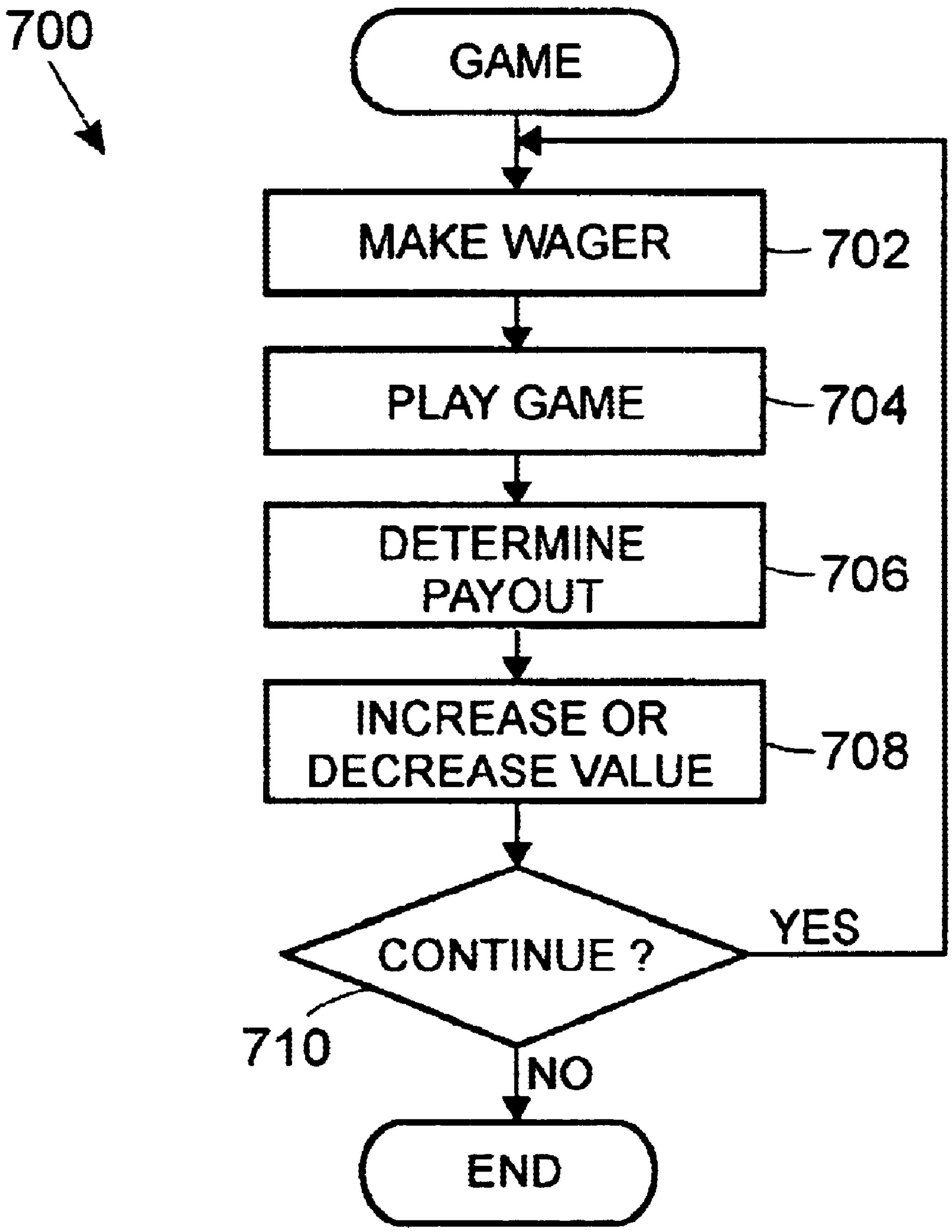
FIG. 21 is a flowchart of a casino game routine that may be performed by the controller of FIG. 5.

FIG. 21 is a flowchart of the general casino game routine 700 that may be utilized instead of or in addition to any of the casino game routines 310, 320, 330, 340, 350 described above. The game routine 700 may represent any type of casino gambling game. Referring to FIG. 21, the routine 700 may begin at block 702 at which a player may make a wager. After the player has made a wager, at block 704 the controller 130 may cause the gambling game to be played, with or without input from the player. At block 706, the controller 130 may evaluate the outcome of the game and determine the payout to which the player is entitled. At block 708, the controller 130 may increase or decrease the player's value based on the results of the game as determined at block 706. At block 710, the controller 130 may cause a message to be displayed on the display unit 80 asking whether the player desires to continue playing the game. If so, the routine may branch back to block 702. If not, the game routine 700 may end and the controller 130 may cause block 360 of FIG. 10 to be performed.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A casino gambling system comprising:

a first gambling unit comprising:

a display unit that is capable of generating video images;

a detection apparatus capable of detecting a direction of movement of a person; and a gambling unit controller operatively coupled to said display unit and said detection apparatus, said gambling unit controller comprising a processor and a memory operatively coupled to said processor, said gambling unit controller being programmed to allow a person to make a wager, said gambling unit controller being programmed to cause a video image associated with a video gambling game to be generated on said display unit, and said gambling unit controller being programmed to determine an outcome and a value payout for said video gambling game;

a second gambling unit comprising:

a display unit that is capable of generating video images; and a gambling unit controller operatively coupled to said display unit of said second gambling unit, said gambling unit controller of said second gambling unit comprising a processor and a memory operatively coupled to said processor of said second gambling unit, said gambling unit controller of said second gambling unit being programmed to allow a person to make a wager, said gambling unit controller of said second gambling unit being programmed to cause a video image associated with a video gambling game to be generated on said display unit of said second gambling unit, and said gambling unit controller of said second gambling unit being programmed to determine an outcome and a value payout for said video gambling game associated with said video image displayed on said display unit of said second gambling unit;

a third gambling unit comprising:

a display unit that is capable of generating video images; and a gambling unit controller operatively coupled to said display unit of third gambling unit, said gambling unit controller of third gambling unit comprising a processor and a memory operatively coupled to said processor of third gambling unit, said gambling unit controller of said third gambling unit being programmed to allow a person to make a wager, said gambling unit controller of said third gambling unit being programmed to cause a video image associated with a video gambling game to be generated on said display unit of said third gambling unit, and said gambling unit controller of said third gambling unit being programmed to determine an outcome and a value payout for said video gambling game associated with said video image displayed on said display unit of said third gambling unit; and a central controller operatively coupled to said first, second and third gambling units, said central controller comprising a processor and a memory operatively coupled to said processor of said central controller, said central controller being programmed to receive a first signal from said first gambling unit in response to said detection apparatus of said first gambling unit detecting movement of a person in a first direction, said central controller being programmed to receive a second signal from said first gambling unit in response to said detection apparatus of said first gambling unit detecting movement of a person in a second direction, said central controller being programmed to transmit a response signal to said second gambling unit in response to receipt of said first signal from said first gambling unit, said response signal causing said second gambling unit to perform an operation, and said central controller being programmed to transmit a response signal to said third gambling unit in response to receipt of said second signal from said first gambling unit, said response signal transmitted to said third gambling unit causing said third gambling unit to perform an operation.

2. A casino gambling system as defined in claim 1 wherein said central controller is programmed to cause said second gambling unit to perform an attract sequence in response to receipt of said first signal from said first gambling unit, said attract sequence comprising a plurality of video images or one or more audio segments.

3. A casino gambling system as defined in claim 1 wherein said central controller is programmed to cause said second gambling unit to perform an attract sequence in response to receipt of said first signal from said first gambling unit, said attract sequence comprising a plurality of video images and one or more audio segments.

4. A casino gambling system as defined in claim 1, wherein said gambling unit controller of said second gambling unit is programmed to perform a screen-saver sequence, and wherein said central controller is programmed to cause said second gambling unit to terminate said screen-saver sequence and initiate an attract sequence in response to receipt of said first signal from said first gambling unit.

5. A casino gambling system as defined in claim 1, wherein said gambling unit controller of said second gambling unit is programmed to perform a screen-saver sequence comprising a plurality of video images without the generation of sound, and wherein said central controller is programmed to cause, in response to receipt of said first signal from said first gambling unit, said second gambling unit to terminate said screen-saver sequence and initiate an attract sequence comprising a plurality of video images and one or more audio segments.

6. A casino gambling system comprising:

a first gambling unit comprising:

a display unit that is capable of generating video images;

a detection apparatus capable of detecting a direction of movement of a person; and a gambling unit controller operatively coupled to said display unit and said detection apparatus, said gambling unit controller comprising a processor and a memory operatively coupled to said processor, said gambling unit controller being programmed to allow a person to make a wager, and said gambling unit controller being programmed to cause a video image associated with a video gambling game to be generated on said display unit;

a second gambling unit comprising:

a display unit that is capable of generating video images; and a gambling unit controller operatively coupled to said display unit of said second gambling unit, said gambling unit controller of said second gambling unit comprising a processor and a memory operatively coupled to said processor of said second gambling unit, said gambling unit controller of said second gambling unit being programmed to allow a person to make a wager, and said gambling unit controller of said second gambling unit being programmed to cause a video image associated with a video gambling game to be generated on said display unit of said second gambling unit;

a third gambling unit comprising:

a display unit that is capable of generating video images; and a gambling unit controller operatively coupled to said display unit of third gambling unit, said gambling unit controller of third gambling unit comprising a processor and a memory operatively coupled to said processor of third gambling unit, said gambling unit controller of said third gambling unit being programmed to allow a person to make a wager, and said gambling unit controller of said third gambling unit being programmed to cause a video image associated with a video gambling game to be generated on said display unit of said third gambling unit;

a central controller operatively coupled to said first, second and third gambling units, said central controller comprising a processor and a memory operatively coupled to said processor of said central controller, said central controller being programmed to receive a first signal from said first gambling unit in response to said detection apparatus of said first gambling unit detecting movement of a person in a first direction, said central controller being programmed to receive a second signal from said first gambling unit in response to said detection apparatus of said first gambling unit detecting movement of a person in a second direction, said central controller being programmed to transmit a response signal to said second gambling unit in response to receipt of said first signal from said first gambling unit, said response signal causing said second gambling unit to display a video image or generate an audible output, and said central controller being programmed to transmit a response signal to said third gambling unit in response to receipt of said second signal from said first gambling unit, said response signal transmitted to said third gambling unit causing said third gambling unit to display a video image or generate an audible output.

7. A casino gambling system as defined in claim 6 wherein said central controller is programmed to cause said second gambling unit to perform an attract sequence in response to receipt of said first signal from said first gambling unit, said attract sequence comprising a plurality of video images or one or more audio segments.

8. A casino gambling system as defined in claim 6 wherein said central controller is programmed to cause said second gambling unit to perform an attract sequence in response to receipt of said first signal from said first gambling unit, said attract sequence comprising a plurality of video images and one or more audio segments.

9. A casino gambling system as defined in claim 6, wherein said gambling unit controller of said second gambling unit is programmed to perform a screen-saver sequence, and wherein said central controller is programmed to cause said second gambling unit to terminate said screen-saver sequence and initiate an attract sequence in response to receipt of said first signal from said first gambling unit.

10. A casino gambling system as defined in claim 6, wherein said gambling unit controller of said second gambling unit is programmed to perform a screen-saver sequence comprising a plurality of video images without the generation of sound, and wherein said central controller is programmed to cause, in response to receipt of said first signal from said first gambling unit, said second gambling unit to terminate said screen-saver sequence and initiate an attract sequence comprising a plurality of video images and one or more audio segments.

11. A casino gambling system comprising:

a first gambling unit comprising:

a display unit that is capable of generating video images;

a detection apparatus capable of detecting the presence of a person; and a gambling unit controller operatively coupled to said display unit and said detection apparatus, said gambling unit controller comprising a processor and a memory operatively coupled to said processor, said gambling unit controller being programmed to allow a person to make a wager, and said gambling unit controller being programmed to cause a video image relating to a video gambling game to be generated on said display unit; and a second gambling unit comprising:

a display unit that is capable of generating video images; and a gambling unit controller operatively coupled to said display unit of said second gambling unit, said gambling unit controller of said second gambling unit comprising a processor and a memory operatively coupled to said processor of said second gambling unit, said gambling unit controller of said second gambling unit being programmed to allow a person to make a wager, and said gambling unit controller of said second gambling unit being programmed to cause a video image associated with a video gambling game to be generated on said display unit of said second gambling unit; and a central controller operatively coupled to said first gambling unit and said second gambling unit, said central controller comprising a processor and a memory operatively coupled to said processor of said central controller, said central controller being programmed to receive a person-detect signal from said first gambling unit in response to said detection apparatus of said first gambling unit detecting the presence of a person, and said central controller being programmed to transmit a response signal to said second gambling unit to cause said second gambling unit to display a video image or generate an audible output in response to detection of the person by said detection apparatus of said first gambling unit.

12. A casino gambling system as defined in claim 11 wherein said central controller is programmed to cause said second gambling unit to perform an attract sequence in response to detection of the person by said detection apparatus of said first gambling unit, said attract sequence comprising a plurality of video images or one or more sound segments.

13. A casino gambling system as defined in claim 11 wherein said central controller is programmed to cause said second gambling unit to perform an attract sequence in response to detection of the person by said detection apparatus of said first gambling unit, said attract sequence comprising a plurality of video images and one or more sound segments.

14. A casino gambling system as defined in claim 11, wherein said gambling unit controller of said second gambling unit is programmed to perform a screen-saver sequence, and wherein said central controller is programmed to cause said second gambling unit to terminate said screen-saver sequence and to initiate an attract sequence in response to detection of the person by said detection apparatus of said first gambling unit.

15. A casino gambling system as defined in claim 6, wherein said gambling unit controller of said second gambling unit is programmed to perform a screen-saver sequence comprising a plurality of video images without the generation of sound, and wherein said central controller is programmed to cause, in response to detection of the person by said detection apparatus of said first gambling unit, said second gambling unit to terminate said screen-saver sequence and to initiate an attract sequence comprising a plurality of video images and one or more sound segments.

* * * * *